(12) United States Patent
Kusunoki

(10) Patent No.: US 11,111,870 B2
(45) Date of Patent: Sep. 7, 2021

(54) METHOD AND SYSTEM FOR DETERMINING ABNORMALITY OF DIFFERENTIAL PRESSURE SENSOR

(71) Applicant: Mazda Motor Corporation, Hiroshima (JP)

(72) Inventor: Tomokuni Kusunoki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 87 days.

(21) Appl. No.: 16/781,231

(22) Filed: Feb. 4, 2020

(65) Prior Publication Data
US 2020/0332738 A1 Oct. 22, 2020

(30) Foreign Application Priority Data
Apr. 19, 2019 (JP) .............................. JP2019-079968

(51) Int. Cl.
*F02D 41/22* (2006.01)
*G01M 15/10* (2006.01)
(Continued)

(52) U.S. Cl.
CPC ......... *F02D 41/22* (2013.01); *F02D 41/0077* (2013.01); *F02D 41/222* (2013.01); *F02M 26/49* (2016.02); *G01L 27/007* (2013.01); *G01M 15/106* (2013.01); *F02M 26/06* (2016.02); *F02M 26/47* (2016.02); *Y02T 10/12* (2013.01)

(58) Field of Classification Search
CPC .... F02D 41/22; F02D 41/222; F02D 41/0077; F02D 41/1448; F02D 41/0007; G01M 15/10; F02M 26/49; F02M 26/06; F02M 26/47; F02M 26/10; G01L 27/007
See application file for complete search history.

(56) References Cited

U.S. PATENT DOCUMENTS 6,659,095 B2 * 12/2003 Kotwicki ............ F02D 41/0072
123/690
6,850,833 B1 * 2/2005 Wang ...................... G01F 9/001
701/108

(Continued)

FOREIGN PATENT DOCUMENTS

JP 2013144961 A 7/2013

*Primary Examiner* — George C Jin
(74) *Attorney, Agent, or Firm* — Alleman Hall Creasman & Tuttle LLP

(57) ABSTRACT

A method of determining an abnormality of a differential pressure sensor which is configured to detect a pressure differential between an upstream side and a downstream side of an EGR valve provided to an EGR passage of an engine, is provided. The method includes the steps of controlling an opening of the EGR valve based on an output value of the differential pressure sensor, determining the abnormality of the differential pressure sensor based on the output value of the differential pressure sensor, controlling at least a throttle valve of the engine toward a closed side so that the pressure differential is maintained at a given pressure or higher when determining, and prohibiting the execution of the abnormality determination when an engine speed is a given engine speed or higher, and permitting the execution of the abnormality determination when the engine speed is less than the given engine speed.

12 Claims, 11 Drawing Sheets

(51) Int. Cl.
*F02D 41/00* (2006.01)
*G01L 27/00* (2006.01)
*F02M 26/49* (2016.01)
*F02M 26/47* (2016.01)
*F02M 26/06* (2016.01)

(56) References Cited

U.S. PATENT DOCUMENTS 7,474,954 B1 * 1/2009 Zagone ............... F02D 41/2441
 701/108
10,345,184 B2 * 7/2019 Choi ....................... G01L 13/00

* cited by examiner

METHOD AND SYSTEM FOR DETERMINING ABNORMALITY OF DIFFERENTIAL PRESSURE SENSOR

TECHNICAL FIELD

The present disclosure relates to a method and a system for determining an abnormality of a differential pressure sensor which detects a pressure differential between an upstream side and a downstream side of an exhaust gas recirculation (EGR) valve provided to an engine EGR passage.

BACKGROUND OF THE DISCLOSURE

Other failure diagnosis technologies have been developed thus far. For example, JP2013-144961A proposes a failure diagnosis device for an EGR system provided with an EGR passage which connects an exhaust passage with an intake passage, an EGR valve which adjusts a flow rate of EGR gas which flows through the EGR passage, and a differential pressure sensor which detects a pressure differential between the EGR gas on the exhaust passage side of the EGR valve and EGR gas on the intake passage side. The technology diagnoses a failure of the EGR system based on the exhaust pressure of the EGR gas on the exhaust passage side when the EGR valve is closed, and the pressure differential detected by the differential pressure sensor.

Meanwhile, the opening of the EGR valve is controlled generally based on the pressure differential detected by the differential pressure sensor. Therefore, in order to secure EGR controllability to improve the fuel efficiency and the emission control, it is desirable to determine abnormalites of the differential pressure sensor with sufficient accuracy. Here, although exhaust pulsation occurs in the exhaust system, this exhaust pulsation becomes a factor in reducing the accuracy of the abnormality determination of the differential pressure sensor. This is because the pressure detected by the differential pressure sensor is changed comparatively largely due to the exhaust pulsation, in other words, noise in the exhaust pulsation appears in the detection value of the differential pressure sensor.

The present inventor discovered that the influence of the exhaust pulsation became smaller as the pressure differential between the upstream side and the downstream side of the EGR valve increased, and he thought that it is good to perform an abnormality determination of the differential pressure sensor in this state where the pressure differential is large. However, if the abnormality determination is performed only in such a state where the pressure differential is large, the frequency of performing the abnormality determination decreases. Therefore, the present inventor considered that a throttle valve in the intake passage be controlled toward the closed side when performing the abnormality determination of the differential pressure sensor so that the pressure differential between the upstream side and the downstream side of the EGR valve is increased. However, when the throttle valve is thus controlled toward the closed side, it tends to lower fuel efficiency. For example, in an engine to which a supercharger is provided, fuel efficiency may be lowered by an increase in the boosting pressure according toward the closed amount of the throttle valve.

Here, the present inventor thought that if a suitable pressure differential could be generated between the upstream side and the downstream side of the EGR valve, the deterioration in fuel efficiency described above could be compensated since the EGR controllability is improved. Especially, as a result of experiments and evaluations, the present inventor discovered that the influence of the exhaust pulsation could be reduced to secure the accuracy of the abnormality determination of the differential pressure sensor by generating a comparatively small pressure differential, without generating a large pressure differential between the upstream side and the downstream side of the EGR valve. In addition, the present inventor thought that the deterioration in fuel efficiency originated from the generation of the pressure differential described above could be sufficiently compensated by an improvement in the EGR controllability due to such generation of the pressure differential.

SUMMARY OF THE DISCLOSURE

Therefore, the present disclosure is made in view of the above situations, and one purpose thereof is to provide a method and a system for determining an abnormality of a differential pressure sensor which detects a pressure differential between an upstream side and a downstream side of an exhaust gas recirculation (EGR) valve. This method and system perform an abnormality determination with sufficient accuracy, while securing the frequency of performing the abnormality determination, without deteriorating fuel efficiency.

According to one aspect of the present disclosure, a method of determining an abnormality of a differential pressure sensor which is configured to detect a pressure differential between an upstream side and a downstream side of an EGR valve provided to an EGR passage of an engine, is provided. The method includes the steps of controlling an opening of the EGR valve based on an output value of the differential pressure sensor, determining the abnormality of the differential pressure sensor based on the output value of the differential pressure sensor, controlling at least a throttle valve of the engine toward a closed side so that the pressure differential between the upstream side and the downstream side of the EGR valve is maintained at greater than or equal to a given pressure when determining the abnormality of the differential pressure sensor, and prohibiting the execution of the abnormality determination of the differential pressure sensor when an engine speed of the engine is greater than or equal to a given engine speed, and permitting the execution of the abnormality determination of the differential pressure sensor when the engine speed is less than the given engine speed.

According to this configuration, since the throttle valve is controlled toward the closed side so that the pressure differential between the upstream side and the downstream side of the EGR valve is maintained at greater than or equal to the given pressure when performing the abnormality determination of the differential pressure sensor, the abnormal determination can be performed with sufficient accuracy while securing the frequency of performing the abnormality determination. Moreover, by thus maintaining the pressure differential at greater than or equal to the given pressure, the deterioration of EGR controllability due to exhaust pulsation can be prevented, thereby securing fuel efficiency. Further, according to this configuration, since the abnormality determination of the differential pressure sensor is executed only when the engine speed is less than the given engine speed, i.e., only in a low-speed range, and the execution of the abnormality determination is prohibited in the high-speed range where an exhaust flow rate is large and the influence of pulsation is large, the accuracy of the abnormality determination can appropriately be secured.

Determining the abnormality of the differential pressure sensor may include determining that the differential pressure sensor is abnormal when a difference between a pressure differential corresponding to the output value of the differential pressure sensor, and a pressure differential between a pressure corresponding to an output value of a pressure sensor provided at the downstream side of the EGR valve and a pressure corresponding to an output value of an atmospheric pressure sensor is greater than or equal to a given determination threshold.

According to this configuration, the abnormality of the differential pressure sensor can be determined accurately.

The method may further include setting the determination threshold at a higher value as the engine speed increases.

According to this configuration, the accuracy of the abnormality determination can be secured effectively, while appropriately eliminating the influence of exhaust pressure when the engine speed increases.

The given pressure may be 5 kPa.

According to this configuration, when performing the abnormality determination of the differential pressure sensor, since the pressure differential between the upstream side and the downstream side of the EGR valve is maintained at 5 kPa or greater, the accuracy of the abnormality determination can be secured effectively.

The method of claim 1, wherein the engine comprises a supercharger configured to boost intake air supplied to the engine, a bypass passage configured to circulate the intake air while bypassing the supercharger, and a bypass valve provided to the bypass passage. The method further includes setting a target boosting pressure of the supercharger and controlling the bypass valve so that the target boosting pressure is achieved. Controlling the bypass valve includes carrying out a feedback control of an opening of the bypass valve based on the target boosting pressure, to compensate a change in a boosting pressure caused by controlling the throttle valve so that the pressure differential between the upstream side and the downstream side of the EGR valve is maintained at greater than or equal to the given pressure in order to determine the abnormality of the differential pressure sensor.

According to this configuration, the pressure at an upstream side of the supercharger (in detail, the pressure at a downstream side of the throttle valve and the upstream side of the supercharger, in other words, the pressure at the downstream side of the EGR valve which defines the pressure differential of the EGR valve), and the pressure at a downstream side of the supercharger (boosting pressure) can be both suitably set at the desired pressures.

The supercharger may be a mechanical supercharger driven by the engine.

In such a supercharger, although the boosting pressure cannot be adjusted by the direct control of the supercharger, the target boosting pressure can appropriately be achieved by controlling the bypass valve as described above.

The EGR passage may recirculate, to the intake passage of the engine, exhaust gas at a downstream side of a catalyst provided to an exhaust passage of the engine.

In an EGR system including such an EGR passage (a so-called "low-pressure EGR system"), since the pressure at the upstream side of the EGR valve becomes substantially the atmospheric pressure, the EGR system recirculates the EGR gas in a state where the pressure differential between the upstream side and the downstream side of the EGR valve is difficult to be produced, but the controllability of the EGR system can appropriately be secured by performing the control so that the pressure differential between the upstream side and the downstream side of the EGR valve is maintained at greater than or equal to the given pressure, as described above.

The engine may have a first combustion mode in which compression ignition combustion of a mixture gas inside the combustion chamber is carried out by a self-ignition in a state where a gas-fuel ratio (G/F) that is a ratio of a total amount of gas inside the combustion chamber including EGR gas from the EGR passage to an amount of fuel inside the combustion chamber is greater than a stoichiometric air-fuel ratio, and an air-fuel ratio (A/F) that is a ratio of an amount of air to the amount of fuel inside the combustion chamber is substantially in agreement with the stoichiometric air-fuel ratio.

For such an engine, by performing the abnormality determination of the differential pressure sensor with sufficient accuracy as described above, since the EGR gas amount is controllable with sufficient accuracy by using the differential pressure sensor of which the reliability is secured, the first combustion mode using the EGR gas can be carried out appropriately.

The engine may further have a second combustion mode in which the compression ignition combustion is carried out in a state where the air-fuel ratio is larger than the stoichiometric air-fuel ratio.

According to this configuration, since the second combustion mode in which the compression ignition combustion is carried out in the state where the air-fuel ratio is lean is further carried out in addition to the first combustion mode, an improvement in fuel efficiency and reduction of $NO_x$ can be achieved appropriately.

The method may further include prohibiting the first combustion mode and permitting the second combustion mode, when the differential pressure sensor is determined to be abnormal.

According to this configuration, the first combustion mode using EGR gas can be prohibited appropriately in the state where the EGR controllability is not secured because of the abnormality of the differential pressure sensor. On the other hand, since the second combustion mode is permitted, while the first combustion mode is prohibited, improvement in fuel efficiency and reduction of $NO_x$ by the compression ignition combustion can appropriately be secured.

The second combustion mode may be carried out in a low-load low-speed range where a load of the engine is less than a given load and the engine speed is less than a given engine speed, and a third combustion mode, in which jump-spark ignition combustion of the entire mixture gas inside the combustion chamber is carried out by jump-spark ignition, may be carried out in other ranges.

According to this configuration, since the second combustion mode by the compression ignition combustion in the low-load low-speed range is carried out and the third combustion mode by the jump-spark ignition combustion is carried out in other ranges, the suitable combustion can be achieved in all the operating ranges of the engine.

According to still another aspect of the present disclosure, an abnormality determination system for a differential pressure sensor is provided. The system includes the differential pressure sensor configured to detect a pressure differential between an upstream side and a downstream side of an exhaust gas recirculation (EGR) valve provided to an EGR passage of an engine, and a controller comprised of circuitry and configured to determine at least an abnormality of the differential pressure sensor. The controller is configured to control an opening of the EGR valve based on an output value of the differential pressure sensor, determine the abnormality of the differential pressure sensor based on the output value of the differential pressure sensor, control at least a throttle valve of the engine toward a closed side so that the pressure differential between the upstream side and the downstream side of the EGR valve is maintained greater than or at a given pressure when determining the abnormality of the differential pressure sensor, and prohibit the abnormality determination of the differential pressure sensor when an engine speed of the engine is greater than or equal to a given engine speed, and permit the abnormality determination of the differential pressure sensor when the engine speed is less than the given engine speed.

According to this configuration, the abnormality determination is performed with sufficient accuracy, while securing the frequency of performing the abnormality determination, without deteriorating fuel efficiency.

DETAILED DESCRIPTION OF THE DISCLOSURE

Hereinafter, a method and a system for determining an abnormality of a differential pressure sensor according to one embodiment of the present disclosure is described with reference to the accompanying drawings.

<System Configuration>

Figure 1:
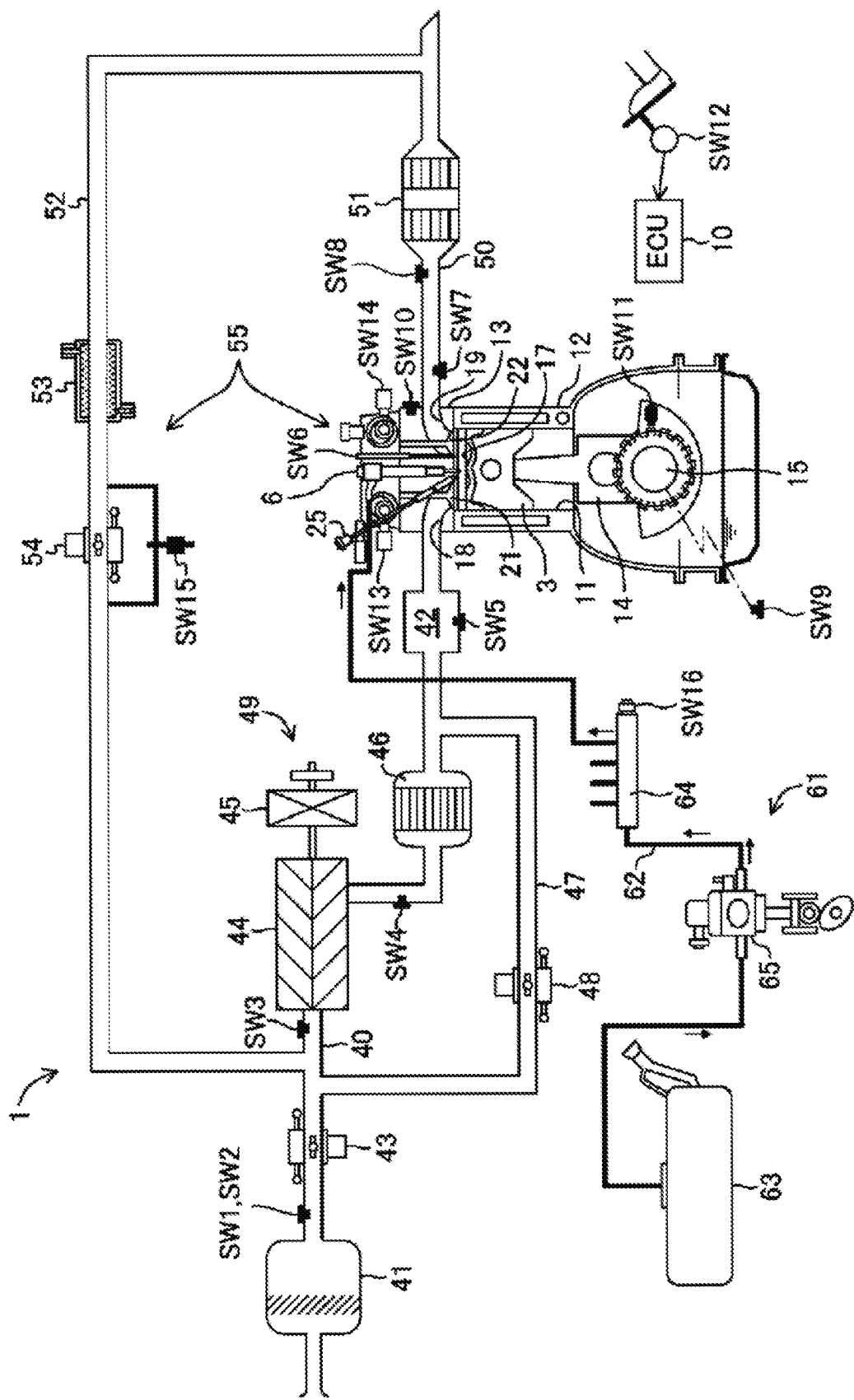
FIG. 1 is a schematic diagram illustrating a configuration of a compression ignition engine according to one embodiment of the present disclosure.
Figure 2:
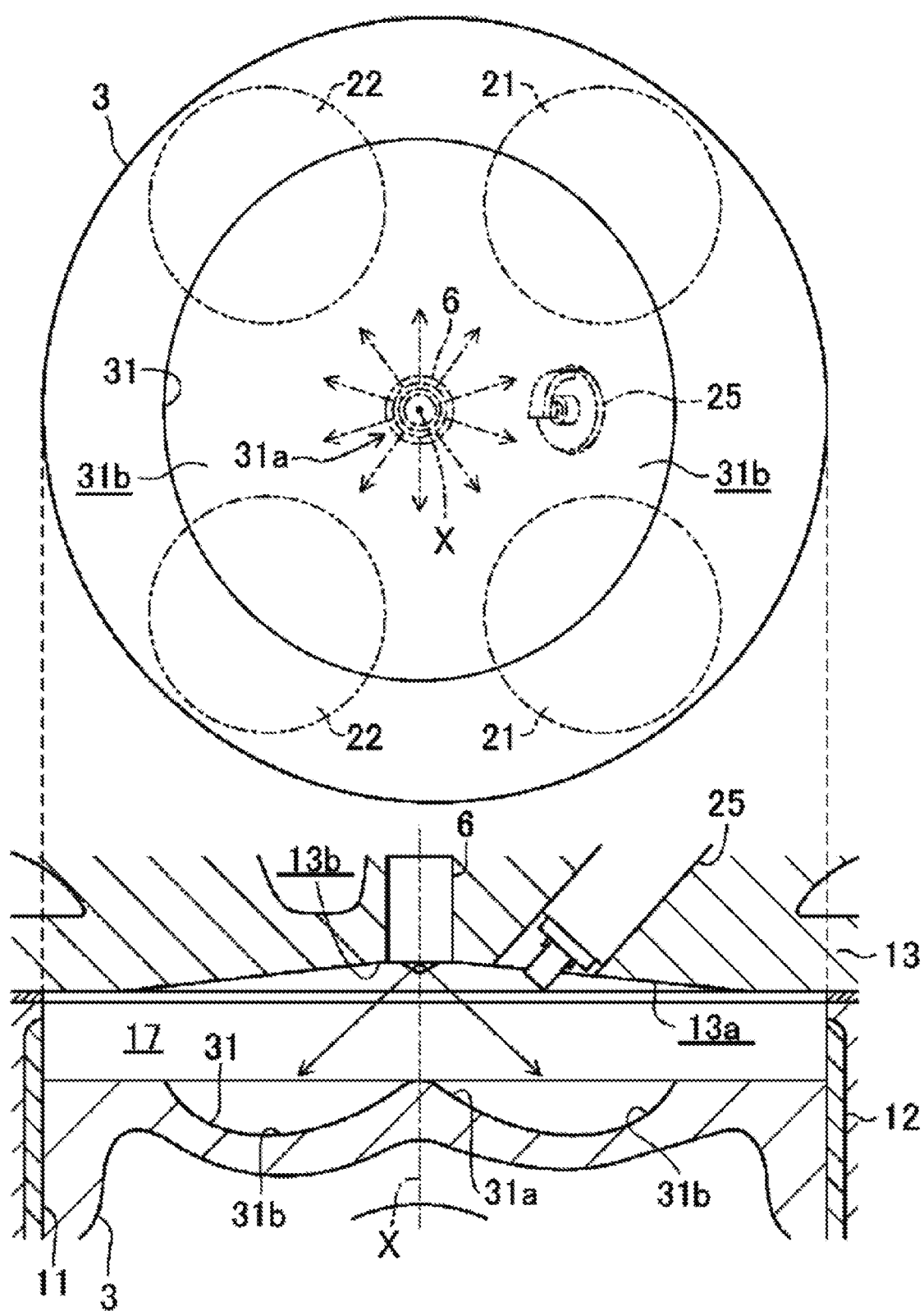
FIG. 2 is a cross-sectional view illustrating a configuration of a combustion chamber of the compression ignition engine according to this embodiment of the present disclosure.
Figure 3:
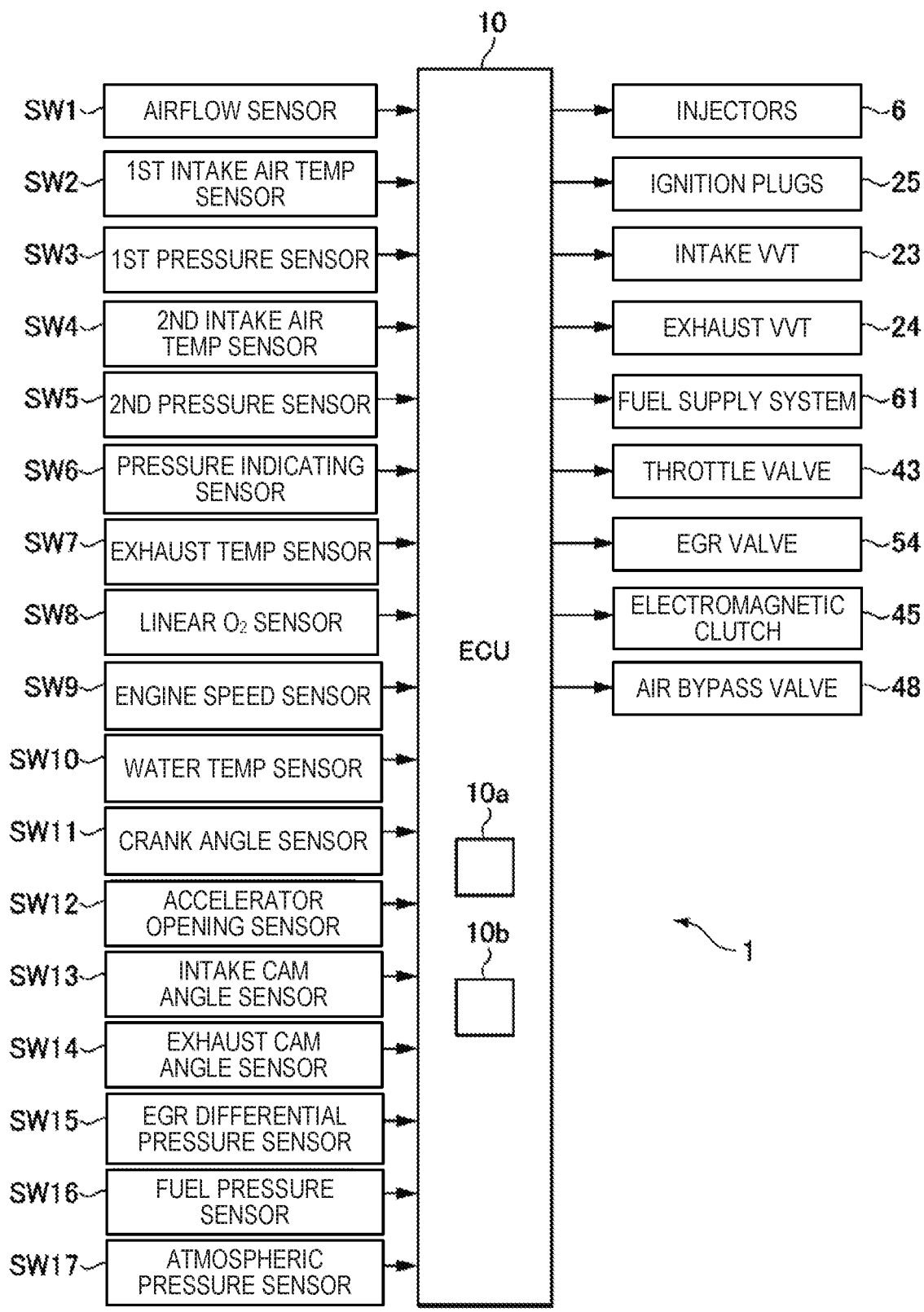
FIG. 3 is a block diagram illustrating a control system of the compression ignition engine according to this embodiment of the present disclosure.

First, referring to FIGS. 1 to 3, a configuration of a compression ignition engine to which a method and a system for determining an abnormality of a differential pressure sensor according to a first embodiment of the present disclosure is applied, is described. FIG. 1 is a view illustrating the configuration of the compression ignition engine according to this embodiment. FIG. 2 is a cross-sectional view illustrating a configuration of a combustion chamber of the engine according to this embodiment. Note that in FIG. 1, the intake side is on the left side of the drawing, and the exhaust side is on the right side of the drawing. In FIG. 2, the intake side is on the right side of the drawing, and the exhaust side is on the left side of the drawing. FIG. 3 is a block diagram illustrating a control system of the engine according to this embodiment.

In this embodiment, the engine 1 is a gasoline engine which performs partial compression ignition combustion (SPark Controlled Compression Ignition: SPCCI) mounted on a four-wheel automobile. In detail, the engine 1 is provided with the cylinder block 12 and a cylinder head 13 placed on a cylinder block 12. A plurality of cylinders 11 are formed inside the cylinder block 12. In FIGS. 1 and 2, although only one cylinder 11 is illustrated, the engine 1 is a multi-cylinder engine in this embodiment.

A piston 3 is slidably inserted in each cylinder 11. The piston 3 is coupled to a crankshaft 15 through a connecting rod 14. The piston 3, together with the cylinder 11 and the cylinder head 13, define a combustion chamber 17. Note that the term "combustion chamber" as used herein is not limited to the meaning of a space formed when the piston 3 reaches a compression top dead center. The term "combustion chamber" may be used in a broader sense. That is, the "combustion chamber" may refer to a space formed by the piston 3, the cylinder 11, and the cylinder head 13, regardless of the position of the piston 3.

As illustrated in FIG. 2, an upper surface of the piston 3 is a flat surface. A cavity 31 is formed in the upper surface of the piston 3. The cavity 31 is dented from the upper surface of the piston 3. The cavity 31 has a shallow dish shape. The cavity 31 faces an injector 6 (described later) when the piston 3 is located near a compression top dead center.

The cavity 31 has a convex part 31a. The convex part 31a is formed substantially at the center of the cylinder 11. The convex part 31a has a substantially cone shape, and extends upwardly along a center axis X of the cylinder 11 from the bottom of the cavity 31. An upper end of the convex part 31a is located at the almost same height as the upper surface of the cavity 31. The cavity 31 also has a dented part 31b formed around the convex part 31a.

As illustrated in FIG. 2, a lower surface of the cylinder head 13, i.e., a ceiling surface of the combustion chamber 17, is comprised of a slope 13a and a slope 13b. The slope 13a ascends from the intake side toward the center axis X. The slope 13b ascends from the exhaust side toward the center axis X. The ceiling surface of the combustion chamber 17 has a so-called pent-roof shape. Note that the shape of the combustion chamber 17 is not limited to the shape illustrated in FIG. 2. For example, the shape of the cavity 31, the shape of the upper surface of the piston 3, the shape of the ceiling surface of the combustion chamber 17, etc. can be changed suitably.

The geometric compression ratio of the engine 1 is set high for the purpose of an improvement in theoretical thermal efficiency, and stabilization of CI (Compression Ignition) combustion (described later). In detail, the geometric compression ratio of the engine 1 is 17:1 or higher. For example, the geometric compression ratio may be 18:1. The geometric compression ratio may be set suitably within a range of 17:1 or higher and 20:1 or lower.

Two intake ports 18 (FIG. 1) are formed in the cylinder head 13 for each cylinder 11. The intake ports 18 communicate with the combustion chamber 17. An intake valve 21 is disposed in each intake port 18. The intake valves 21 open and close the passage between the combustion chamber 17 and the intake ports 18. The intake valves 21 are opened and closed at a given timing by an intake VVT (Variable Valve Timing) 23 (FIG. 3) which is a variable valve operating mechanism. The intake VVT 23 is configured to continuously change a rotational phase of an intake cam shaft within a given angle range. Therefore, an open timing and a close timing of the intake valves 21 can be changed continuously. Note that the intake VVT 23 is configured to be driven electrically or hydraulically.

Two exhaust ports 19 (FIG. 1) are formed in the cylinder head 13 for each cylinder 11. The exhaust ports 19 communicate with the combustion chamber 17. An exhaust valve 22 is disposed in each exhaust port 19. The exhaust valves 22 open and close a passage between the combustion chamber 17 and the exhaust ports 19. The exhaust valves 22 are opened and closed at a given timing by an exhaust VVT 24 (FIG. 3) which is a variable valve operating mechanism. The exhaust VVT 24 is configured to continuously change a rotational phase of an exhaust cam shaft within a given angle range. Therefore, an open timing and a close timing of the exhaust valve 22 can be changed continuously. Note that the exhaust VVT 24 is configured to be driven electrically or hydraulically.

Although the details are described later, in this embodiment, the engine 1 uses the intake VVT 23 and the exhaust VVT 24 to adjust a length of an overlap period of opening of the intake valves 21 and opening of the exhaust valves 22. Therefore, it can purge the residual gas inside the combustion chamber 17, or confine hot burnt gas inside the combustion chamber 17 (i.e., introduce internal EGR (Exhaust Gas Recirculation) gas into the combustion chamber 17). Note that such an introduction of internal EGR gas is not necessarily achieved by the VVTs.

As illustrated in FIG. 2, the injector 6 is attached to the cylinder head 13 for every cylinder 11. The injector 6 is configured to directly inject fuel into the combustion chamber 17. The injector 6 is disposed at a valley part of the pent roof where the intake-side slope 13*a* intersects with the exhaust-side slope 13*b*. Moreover, the injector 6 is disposed so that its injection axial center is oriented along the center axis X of the cylinder 11. The injection axial center of the injector 6 is substantially in agreement with the position of the convex part 31*a* of the cavity 31. The injector 6 opposes to the cavity 31. Note that the injection axial center of the injector 6 does not need to be in agreement with the center axis X of the cylinder 11. Also in such a case, it is desirable that the injection axial center of the injector 6 is in agreement with the position of the convex part 31*a* of the cavity 31.

Although detailed illustration is omitted, the injector 6 is comprised of a multi-nozzle hole type fuel injection valve having a plurality of nozzle holes. As illustrated by arrows in FIG. 2, the injector 6 injects fuel so that the fuel spray spreads radiately from the center of the combustion chamber 17.

As will be described later, the injector 6 may inject fuel at a timing where the piston 3 is located near a compression top dead center. In that case, when the injector 6 injects fuel, the fuel spray flows downwardly along the convex part 31*a* of the cavity 31, while being mixed with fresh air, and then flows so as to spread radiately outward from the center of the combustion chamber 17 along the bottom surface and the circumferential surface of the dented part 31*b*. Then, a mixture gas reaches the opening of the cavity 31, and then flows toward the center of the combustion chamber 17 from radially outward, along the intake-side slope 13*a* and the exhaust-side slope 13*b*. Note that the injector 6 is not limited to a multi-nozzle hole type injector. The injector 6 may adopt an outward lifting valve type injector.

As illustrated in FIG. 1, the injector 6 is connected to a fuel supply system 61. The fuel supply system 61 is provided with a fuel tank 63 constituted so as to store fuel, and a fuel supply path 62 which couples the fuel tank 63 to the injector 6. The fuel supply path 62 is provided with a fuel supply pump 65 and a common rail 64. The fuel supply pump 65 is configured to pump fuel to the common rail 64. In this embodiment, the fuel supply pump 65 is a plunger-type pump driven by the crankshaft 15. The common rail 64 is configured to store at a high fuel pressure the fuel pumped from the fuel supply pump 65. When the injector 6 opens, the fuel stored in the common rail 64 is injected into the combustion chamber 17 from the nozzle holes of the injector 6. The fuel supply system 61 is configured to supply high-pressure fuel at greater than or equal to 30 MPa to the injector 6. The maximum fuel pressure of the fuel supply system 61 may be about 120 MPa, for example. The pressure of the fuel supplied to the injector 6 may be changed according to the operating state of the engine 1. Note that the configuration of the fuel supply system 61 is not limited to the above configuration.

An ignition plug 25 is attached to the cylinder head 13 for every cylinder 11. The ignition plug 25 forcibly ignites the mixture gas inside the combustion chamber 17. As illustrated in FIG. 2, the ignition plug 25 is disposed at the intake side with respect to the center axis X of the cylinder 11 in this embodiment. Moreover, the ignition plug 25 is located between the two intake ports 18. The ignition plug 25 is attached to the cylinder head 13 while inclining downwardly toward the center of the combustion chamber 17. Electrodes of the ignition plug 25 are located near the ceiling surface of the combustion chamber 17 while facing to the combustion chamber 17.

As illustrated in FIG. 1, an intake passage 40 is connected to one side surface of the engine 1. The intake passage 40 communicates with the intake port 18 of each cylinder 11. The intake passage 40 is a passage through which gas to be introduced into the combustion chamber 17 flows. An air cleaner 41 which filters fresh air is disposed at an upstream end of the intake passage 40. A surge tank 42 is disposed near a downstream end of the intake passage 40. Although detailed illustration is omitted, the intake passage 40 downstream of the surge tank 42 constitutes an independent passage which branches to every cylinder 11. A downstream end of the independent passage is connected to the intake ports 18 of each cylinder 11.

A throttle valve 43 is disposed between the air cleaner 41 and the surge tank 42 in the intake passage 40. The throttle valve 43 is configured to adjust its opening to vary an amount of fresh air introduced into the combustion chamber 17.

A supercharger 44 is disposed downstream of the throttle valve 43 in the intake passage 40. The supercharger 44 is configured to boost gas introduced into the combustion chamber 17. In this embodiment, the supercharger 44 is a mechanical supercharger driven by the engine 1. The mechanical supercharger 44 may be a Roots type, for example. The mechanical supercharger 44 may have any kind of configuration. The mechanical supercharger 44 may be Lysholm type or a centrifugal type.

An electromagnetic clutch 45 is provided between the supercharger 44 and the output shaft of the engine 1. The electromagnetic clutch 45 transmits a driving force from the engine 1 to the supercharger 44, and intercepts the transmission of the driving force, between the supercharger 44 and the engine 1. As will be described later, the supercharger 44 is switched between ON and OFF by an ECU 10 (FIG. 3) switching between a connected state and a disconnected state of the electromagnetic clutch 45. That is, this engine 1 is configured to switch between the supercharger 44 boosting gas introduced into the combustion chamber 17, and the supercharger 44 not boosting gas introduced into the combustion chamber 17.

An intercooler 46 is disposed downstream of the supercharger 44 in the intake passage 40. The intercooler 46 is configured to cool gas compressed by the supercharger 44. The intercooler 46 may be configured to be a water-cooling type, for example.

A bypass passage 47 is connected to the intake passage 40. The bypass passage 47 connects an upstream part of the supercharger 44 and a downstream part of the intercooler 46 in the intake passage 40 to bypass the supercharger 44 and the intercooler 46. An air bypass valve 48 which is a bypass control valve is disposed in the bypass passage 47. The air bypass valve 48 adjusts a flow rate of gas which flows through the bypass passage 47.

When the supercharger 44 is turned OFF (i.e., when the electromagnetic clutch 45 is disconnected), the air bypass valve 48 is fully opened. Therefore, the gas which flows through the intake passage 40 bypasses the supercharger 44, and is introduced into the combustion chamber 17 of the engine 1. The engine 1 is operated in a non-boosted state, i.e., naturally aspirated state. When the supercharger 44 is turned ON (i.e., when the electromagnetic clutch 45 is connected), a portion of gas which passed the supercharger 44 flows back upstream of the supercharger through the bypass passage 47. Since an amount of a reverse flow rate can be adjusted by adjusting the opening of the air bypass valve 48, the boosting pressure of the gas introduced into the combustion chamber 17 can be adjusted. In this example configuration, a supercharging system 49 is comprised of the supercharger 44, the bypass passage 47, and the air bypass valve 48.

An exhaust passage 50 is connected to the other side surface of the engine 1. The exhaust passage 50 communicates with the exhaust ports 19 of each cylinder 11. The exhaust passage 50 is a passage through which exhaust gas discharged from the combustion chamber 17 flows. Although detailed illustration is omitted, an upper part of the exhaust passage 50 constitutes an independent passage which branches to every cylinder 11. An upstream end of the independent passage is connected to the exhaust ports 19 of each cylinder 11. An exhaust emission control system having one or more catalytic converters 51 is disposed in the exhaust passage 50. The catalytic converter 51 is comprised of a three-way catalyst. Note that the exhaust emission control system is not limited to those only including the three-way catalyst.

An EGR passage 52 which constitutes an external EGR system is connected between the intake passage 40 and the exhaust passage 50. The EGR passage 52 is a passage for recirculating a portion of burnt gas to the intake passage 40. An upstream end of the EGR passage 52 is connected to the exhaust passage 50 downstream of the catalytic converter 51. A downstream end of the EGR passage 52 is connected to the intake passage 40 upstream of the supercharger 44.

An EGR cooler 53 of a water-cooling type is disposed in the EGR passage 52. The EGR cooler 53 is configured to cool burnt gas. An EGR valve 54 is also disposed in the EGR passage 52. The EGR valve 54 is configured to adjust a flow rate of burnt gas which flows through the EGR passage 52. By adjusting the opening of the EGR valve 54, an amount of the cooled burnt gas, i.e., a recirculating amount of the external EGR gas, can be adjusted.

In this embodiment, the EGR system 55 is comprised of an external EGR system comprised of the EGR passage 52 and the EGR valve 54, and an internal EGR system comprised of the intake VVT 23 and the electric VVT 24 which are described above.

As illustrated in FIG. 3, the engine 1 is provided with the ECU (Engine Control Unit) 10 for operating this system. The ECU 10 is a controller based on a well-known microcomputer, and is provided with a processor 10a (e.g., a central processing unit (CPU)) which executes software programs, memory 10b which is comprised of, for example, RAM (Random Access Memory) and/or ROM (Read Only Memory) and stores the software programs and data, and an input/output bus which inputs and outputs an electrical signal. The ECU 10 is one example of the "controller."

As illustrated in FIGS. 1 and 3, the ECU 10 is connected to various kinds of sensors SW1-SW17. The sensors SW1-SW17 output respective detection signals to the ECU 10. The sensor includes the following sensors.

That is, the sensors include an airflow sensor SW1 which detects a flow rate of fresh air which flows through the intake passage 40 and a first intake air temperature sensor SW2 which detects the temperature of fresh air, which are disposed downstream of the air cleaner 41 in the intake passage 40, a first pressure sensor SW3 which is disposed downstream of the connecting position of the EGR passage 52 to the intake passage 40 and upstream of the supercharger 44, and detects the pressure of gas flowing into the supercharger 44 (hereinafter, suitably referred to as a "supercharger upstream pressure"), a second intake air temperature sensor SW4 which is disposed downstream of the supercharger 44 in the intake passage 40 and upstream of the connecting position of the bypass passage 47 in the intake passage 40, and detects the temperature of gas flowed out of the supercharger 44, a second pressure sensor SW5 which is attached to the surge tank 42 and detects the pressure of gas downstream of the supercharger 44 (hereinafter, suitably referred to as a "boosting pressure"), a pressure indicating sensor SW6 which is attached to the cylinder head 13 corresponding to each cylinder 11 and detects the pressure inside each combustion chamber 17 (in-cylinder pressure), an exhaust temperature sensor SW7 which is disposed in the exhaust passage 50 and detects the temperature of exhaust gas discharged from the combustion chamber 17, a linear $O_2$ sensor SW8 which detects oxygen concentration contained in exhaust gas discharged from the combustion chamber 17 (linear A/F sensor: LAFS), an engine speed sensor SW9 which is disposed near the output shaft of the engine 1 and detects the rotational speed of the output shaft, a water temperature sensor SW10 which is attached to the engine 1 and detects the temperature of coolant, a crank angle sensor SW11 which is attached to the engine 1 and detects the rotational angle of the crankshaft 15, an accelerator opening sensor SW12 which is attached to an accelerator pedal mechanism and detects the accelerator opening corresponding to an operating amount of the accelerator pedal, an intake cam angle sensor SW13 which is attached to the engine 1 and detects the rotational angle of the intake cam shaft, an exhaust cam angle sensor SW14 which is attached to the engine 1 and detects the rotational angle of the exhaust cam shaft, an EGR differential pressure sensor SW15 which is disposed in the EGR passage 52 and detects the pressure differential between upstream and downstream of the EGR valve 54, a fuel pressure sensor SW16 which is attached to the common rail 64 of the fuel supply system 61 and detects the pressure of fuel supplied to the injector 6, and an atmospheric pressure sensor SW17 which detects atmospheric pressure (typically provided in the ECU 10).

The ECU 10 determines the operating state of the engine 1 based on these detection signals, and calculates a controlled variable of each device. The ECU 10 outputs control signals corresponding to the calculated controlled variables to the injector 6, the ignition plug 25, the intake VVT 23, the exhaust VVT 24, the fuel supply system 61, the throttle valve 43, the EGR valve 54, the electromagnetic clutch 45 of the supercharger 44, and the air bypass valve 48, so as to control the engine 1. For example, the ECU 10 adjusts the boosting pressure by adjusting the opening of the air bypass valve 48 based on the pressure differential before and after the supercharger 44 obtained from the detection signals of the first pressure sensor SW3 and the second pressure sensor SW5. Moreover, the ECU 10 adjusts an amount of the external EGR gas introduced into the combustion chamber 17 by adjusting the opening of the EGR valve 54 based on the pressure differential before and after the EGR valve 54 obtained from the detection signal of the EGR differential pressure sensor SW15 (hereinafter, may simply be referred to as the "differential pressure sensor").

<Operating Range>

Figure 4A:
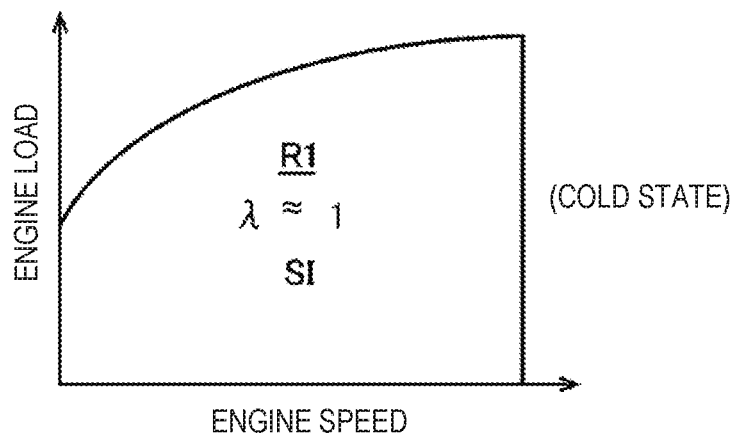
FIGS. 4A to 4C are charts of operating ranges of the engine according to this embodiment of the present disclosure.
Figure 4B:
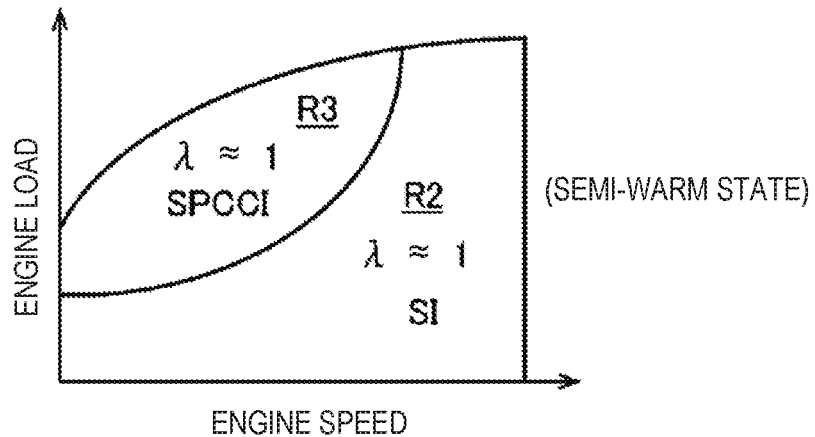
Figure 4C:
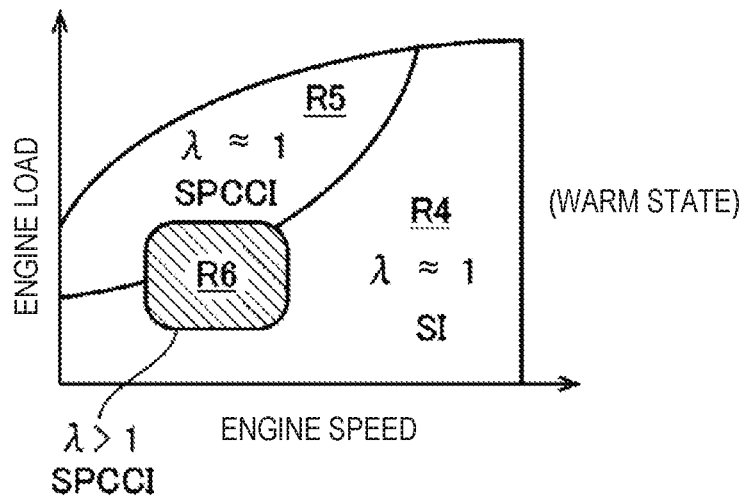

Next, referring to FIG. 4, an operating range of the engine according to this embodiment of the present disclosure is described. FIGS. 4A to 4C are operation maps illustrating a difference in the control according to a progress of a warm-up of the engine 1, and the engine speed and a load of the engine 1. In this embodiment, different operation maps are respectively provided corresponding to 3 stages of a warm state in which the warm-up of the engine 1 is finished (e.g., when "engine water temperature≥80° C." or "intake air temperature≥50° C."), a semi-warm state in which the warm-up of the engine 1 progresses to the middle (e.g., when "30° C.≤engine water temperature<80° C." and "25° C.≤intake air temperature<50° C."), and a cold state in which the engine 1 is not warm (e.g., when "engine water temperature≤30° C." and "intake air temperature<25° C.").

First, referring to FIG. 4A, a combustion control during the cold state of the engine 1 is described. During the cold state, comparatively orthodox SI (Spark Ignition) combustion is performed in a range R1 corresponding to substantially the entire operating range of the engine 1. SI combustion is a mode in which mixture gas is ignited by a jump-spark ignition using the ignition plug 25, and mixture gas is then forcibly combusted by flame propagation which expands the combustion area from its igniting point to the perimeter. Note that SI combustion is an example of a "third combustion mode" of the engine 1.

In order to realize such SI combustion, primary configured parts of the engine 1 are controlled by the ECU 10 as follows. The injector 6 injects fuel over a given period which overlaps at least an intake stroke. For example, the injector 6 injects fuel over a series of periods from an intake stroke to a compression stroke. Moreover, the ignition plug 25 ignites the mixture gas near a compression top dead center. For example, the ignition plug 25 ignites the mixture gas at a timing slightly on the advanced side of the compression top dead center. Then, SI combustion is started triggered by this ignition, and all the mixture gas inside the combustion chamber 17 combusts by flame propagation. The opening of the EGR valve 54 is controlled so that an air-fuel ratio (A/F) which is a ratio of an amount of air inside the combustion chamber 17 to an amount of fuel inside the combustion chamber 17 becomes substantially a stoichiometric air-fuel ratio (14.7:1).

Next, referring to FIG. 4B, a combustion control during the semi-warm state of the engine 1 is described. During the semi-warm state, SI combustion is performed in a range R2, similar to the range R1 of the cold state. On the other hand, in a range R3, partial compression ignition combustion (SPCCI combustion) in which SI combustion and CI combustion are mixed is performed. CI combustion is a mode in which the mixture gas is combusted by a self-ignition under an environment where the mixture gas is raised to a high temperature and a high pressure by the compression of the piston 3. SPCCI combustion in which SI combustion and CI combustion are mixed is a combustion mode in which SI combustion of a portion of the mixture gas inside the combustion chamber 17 is carried out by the jump-spark ignition, which is performed under an environment where the mixture gas is about to self-ignite, and after this SI combustion (by further increase in the temperature and the pressure accompanying the SI combustion), CI combustion of the remaining mixture gas inside the combustion chamber 17 is carried out by the self-ignition.

SPCCI combustion has a characteristic in which the heat release becomes steeper in CI combustion than in SI combustion. For example, a waveform of a rate of heat release by SPCCI combustion becomes shallower in a rising slope in an early stage of the combustion corresponding to SI combustion than a rising slope corresponding to the subsequent CI combustion. In other words, the waveform of the rate of heat release during SPCCI combustion is formed so that a heat release rate part formed by SI combustion in which the rising slope is relatively shallow, and a heat release rate part formed by CI combustion in which the rising slope is relatively steep continue in this order. Moreover, corresponding to such a tendency of the rate of heat release, in SPCCI combustion, a rate of pressure buildup caused inside the combustion chamber 17 (dp/dθ) becomes smaller during SI combustion than during CI combustion.

When the temperature and the pressure inside the combustion chamber 17 are increased by SI combustion, unburnt mixture gas self-ignites in connection with the increase in the temperature and the pressure, thereby starting CI combustion. At this timing of self-ignition (i.e., a timing at which CI combustion starts), the slope of the waveform of the rate of heat release changes from shallow to steep. That is, the waveform of the rate of heat release in SPCCI combustion has an inflection point at a timing where CI combustion starts.

After the start of CI combustion, SI combustion and CI combustion are performed in parallel. Since CI combustion is faster in the combustion rate of the mixture gas than SI combustion, the rate of heat release becomes relatively large. However, since CI combustion is performed after a compression top dead center, the slope of the waveform of the rate of heat release will not become excessive. That is, since a motoring pressure decreases by a descent of the piston 3 after passing through the compression top dead center, the increase in the rate of heat release is reduced, and, as a result, dp/dθ during CI combustion becoming excessive can be avoided. Thus, in SPCCI combustion, because of the nature of CI combustion being performed after SI combustion, dp/dθ used as an index of combustion noise is difficult to become excessive, and therefore, combustion noise can be reduced compared with simple CI combustion (when carrying out CI combustion of all the fuel).

SPCCI combustion ends when CI combustion ends. Since CI combustion is fast in the combustion rate compared with SI combustion, it can bring a combustion end timing earlier than the simple SI combustion (when carrying out SI combustion of all the fuel). In other words, in SPCCI combustion, the combustion end timing can be brought close to the compression top dead center within an expansion stroke. Therefore, in SPCCI combustion, fuel efficiency can be improved compared with the simple SI combustion.

Especially in the range R3 illustrated in FIG. 4B, the air-fuel ratio inside the combustion chamber 17 is set substantially as a stoichiometric air-fuel ratio (14.7:1), and SPCCI combustion (hereinafter, suitably referred to as a "first SPCCI combustion," which is an example of a "first combustion mode" of the engine 1) is performed. In other words, in the range R3, SPCCI combustion is performed under a stoichiometric environment where an excess air factor $\lambda$ (a value obtained by dividing an actual air-fuel ratio by the stoichiometric air-fuel ratio) becomes 1 or near 1 ($\lambda \approx 1$).

In such a range R3, the primary configured parts of the engine 1 are controlled by the ECU 10 as follows. The injector 6 advances the fuel injection timing of at least a portion of fuel to an intake stroke. For example, the injector 6 performs a first fuel injection in an intake stroke and performs a second fuel injection in a compression stroke. The ignition plug 25 ignites the mixture gas near a compression top dead center. For example, the ignition plug 25 ignites the mixture gas at a timing slightly on the advanced side of the compression top dead center. Moreover, the ignition plug 25 ignites the mixture gas at the timing on more advanced side than the SI combustion. Then, SPCCI combustion is started triggered by this ignition, the portion of the mixture gas inside the combustion chamber 17 combusts by flame propagation (SI combustion), and the remaining mixture gas then combusts by self-ignition (CI combustion).

The intake VVT 23 and the exhaust VVT 24 set the valve timings of the intake valve 21 and the exhaust valve 22 as timings for performing internal EGR, i.e., such timings that a valve overlap period where both the intake valve 21 and the exhaust valve 22 are opened ranging over an exhaust top dead center is fully formed. Therefore, the internal EGR which makes burnt gas remain inside the combustion chamber 17 is achieved to raise the temperature inside the combustion chamber 17 (initial temperature before compression). In detail, in the range R3, the intake VVT 23 closes the intake valve 21 at a timing earlier than that of SI combustion, and the exhaust VVT 24 closes the exhaust valve 22 at a timing later than that of SI combustion. The throttle valve 43 is closed to a given intermediate opening, and the air-fuel ratio (A/F) throughout the combustion chamber 17 is set substantially as a stoichiometric air-fuel ratio.

The opening of the EGR valve 54 is controlled so that the air-fuel ratio throughout the combustion chamber 17 becomes a target air-fuel ratio. Fundamentally, the EGR valve 54 adjusts a flow rate inside the EGR passage 52 so that an amount of gas obtained by subtracting an amount of air corresponding to the target air-fuel ratio (A/$\approx$14.7:1) and an amount of burnt gas which remains inside the combustion chamber 17 by the internal EGR from the total amount of gas introduced into the combustion chamber 17 is recirculated from the EGR passage 52 to the combustion chamber 17 as external EGR gas. Here, in the range R3, as described above, since the air-fuel ratio (A/F) is set substantially as a stoichiometric air-fuel ratio and the EGR gas (external EGR gas and internal EGR gas) is introduced into the combustion chamber 17, a gas-fuel ratio (G/F) which is a ratio of the total amount of gas inside the combustion chamber 17 including the EGR gas to an amount of fuel becomes lean which is larger than a stoichiometric air-fuel ratio (it is a value exceeding 14.7:1, and for example, it is 35:1 to 45:1).

Next, referring to FIG. 4C, a combustion control during the warm state of the engine 1 is described. During the warm state, in a range R4, SI combustion is performed similar to the range R1 of the cold state and the range R2 of the semi-warm state, and in a range R5, SPCCI combustion is performed similar to the range R3 of the semi-warm state. However, in the range R5, the gas-fuel ratio (G/F) is not set as lean, like the range R3. On the other hand, unlike the range R3 and the range R5, in a range R6, the air-fuel ratio (A/F) inside the combustion chamber 17 is set as a larger value than a stoichiometric air-fuel ratio (14.7:1) and SPCCI combustion is carried out (hereinafter, referred to as a "second SPCCI combustion," which is an example of a "second combustion mode" of the engine 1). In other words, in the range R6, SPCCI combustion is performed under an air-fuel ratio lean environment where the excess air factor $\lambda$, becomes larger than 1 ($\lambda$>1). In one example, the excess air factor $\lambda$ is set as two or larger.

In such a range R6, the primary configured parts of the engine 1 are controlled by the ECU 10 as follows. The injector 6 injects the entire amount or a major part of fuel to be injected in one cycle during a compression stroke. For example, the injector 6 injects fuel in two stages from the middle period to the later period of the compression stroke. The ignition plug 25 ignites the mixture gas near a compression top dead center. For example, the ignition plug 25 ignites the mixture gas at a timing slightly on the advanced side of the compression top dead center (a timing on more advanced side of SI combustion). Then, SPCCI combustion is started triggered by this ignition, a portion of the mixture gas inside the combustion chamber 17 combusts by flame propagation (SI combustion), and the remaining mixture gas then combusts by self-ignition (CI combustion).

The intake VVT 23 and the exhaust VVT 24 sets the valve timings of the intake valve 21 and the exhaust valve 22 as timings for performing internal EGR, i.e., such timings that the valve overlap period where both the intake valve 21 and the exhaust valve 22 are opened ranging over an exhaust top dead center is fully formed. Therefore, the internal EGR which makes burnt gas remain inside the combustion chamber 17 is achieved to raise the temperature inside the combustion chamber 17 (initial temperature before compression). In detail, in the range R6, the intake VVT 23 closes the intake valve 21 at a timing earlier than that of SI combustion, and the exhaust VVT 24 closes the exhaust valve 22 at a timing later than that of SI combustion. The throttle valve 43 is controlled toward an opening equivalent to a fully open, and the air-fuel ratio (A/F) throughout the combustion chamber 17 is set as 30:1 to 40:1.

<Abnormal Determination of Differential Pressure Sensor>

Below, a method of determining an abnormality of the differential pressure sensor (EGR differential pressure sensor) SW15 according to this embodiment of the present disclosure, and a method of controlling the engine 1 relevant to this abnormality determination are described.

Figure 5:
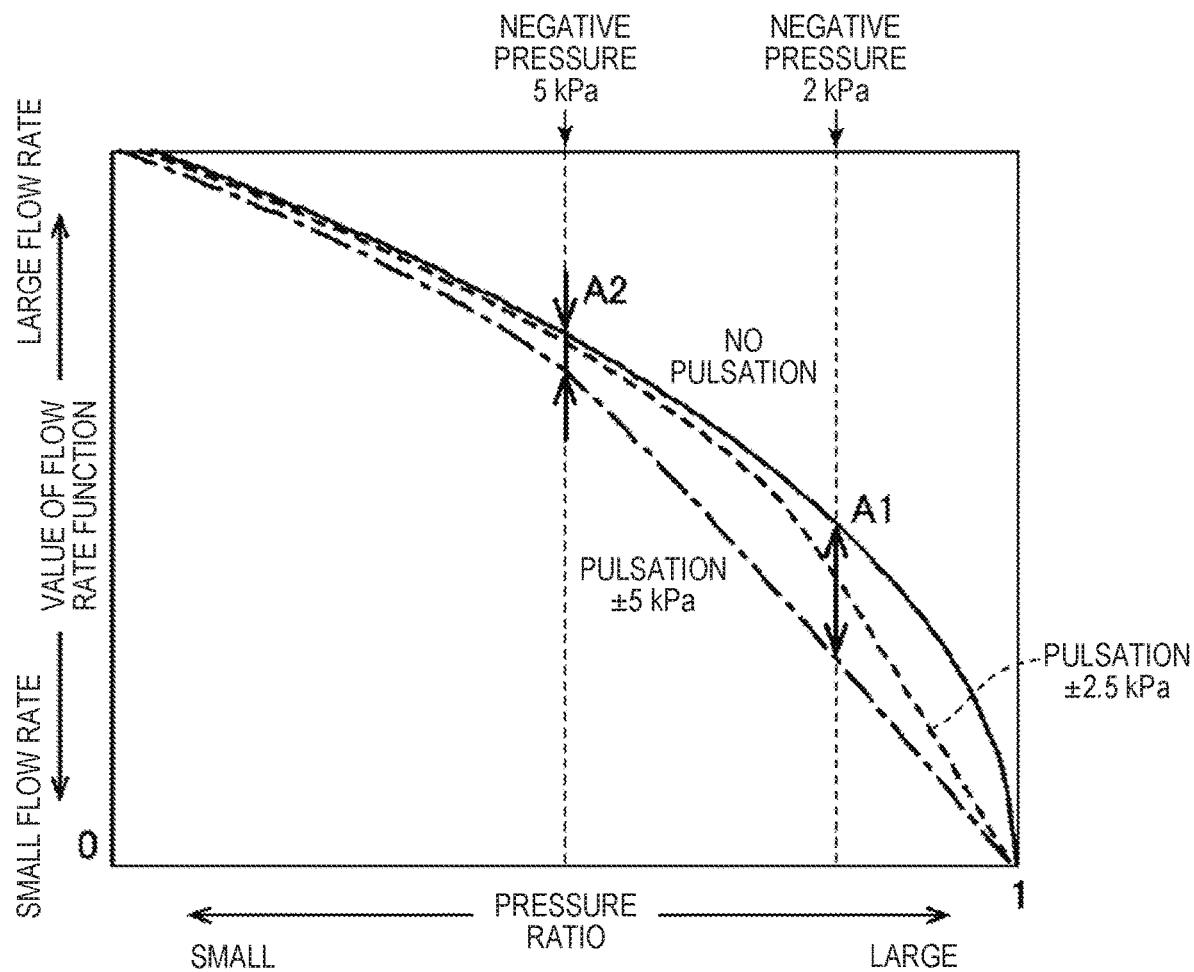
FIG. 5 is a graph of a relationship between a pressure ratio of the upstream side and the downstream side of an EGR valve, and a flow rate function value.
Figure 6:
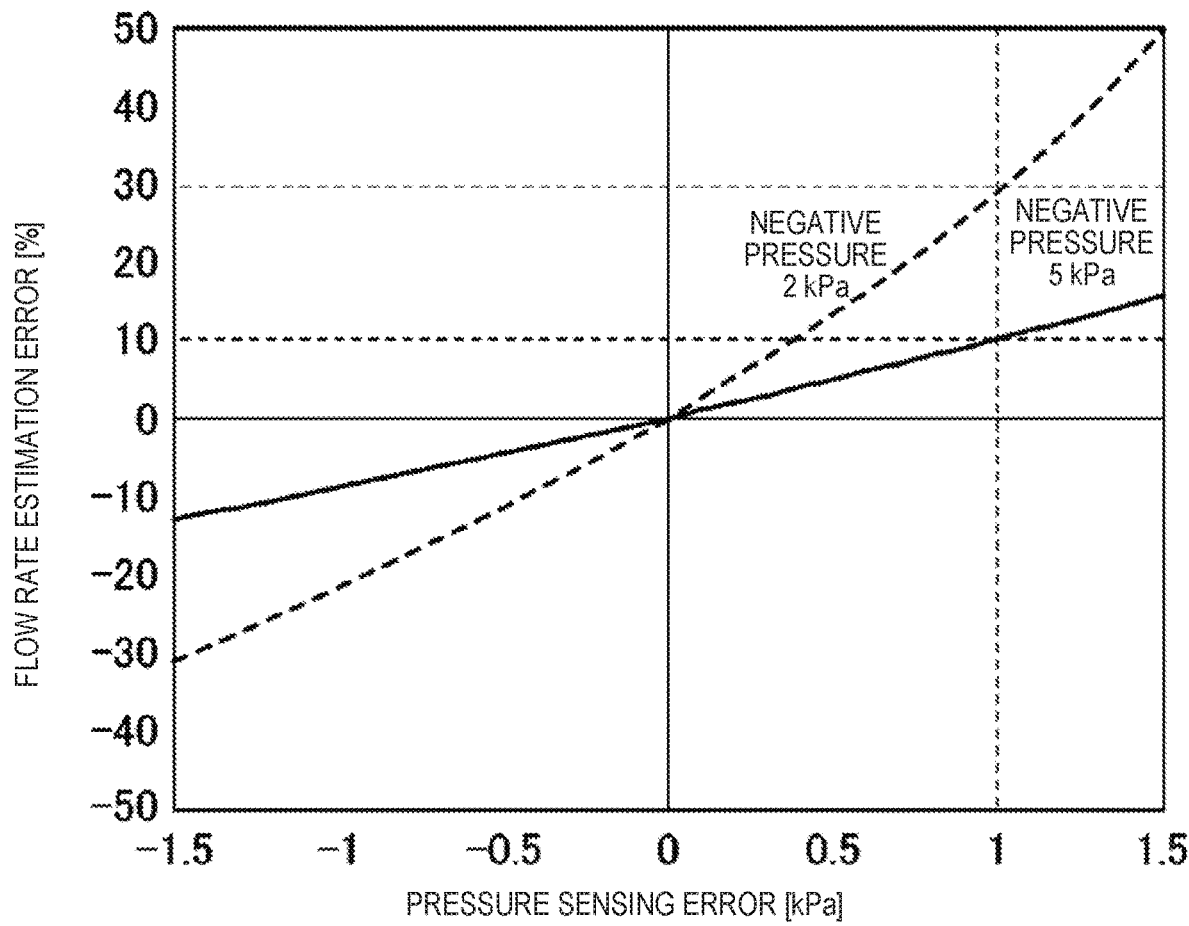
FIG. 6 is a graph of a relationship between a pressure sensing error of a differential pressure sensor, and a flow rate estimation error.

First, referring to FIGS. 5 and 6, a basic concept of the method of determining the abnormality of the differential pressure sensor SW15 according to this embodiment of the present disclosure is described. The horizontal axis of FIG.

5 indicates a ratio of the pressure at the upstream side and the pressure at the downstream side of the EGR valve 54 (pressure ratio). The value of the pressure ratio becomes smaller as the pressure at the downstream side of the EGR valve 54 becomes less than the pressure at the upstream side of the EGR valve 54 (i.e., as the negative pressure increases). Moreover, the vertical axis of FIG. 5 indicates a value of the flow rate function which is defined according to the pressure ratio, etc. of the upstream side and the downstream side of the EGR valve 54, and is an index indicative of a flow rate of EGR gas which flows through the EGR valve 54 (i.e., a flow rate of EGR gas which is recirculated from the EGR passage 52 to the intake passage 40). The flow rate of EGR gas which flows through the EGR valve 54 is proportional to the flow rate function. Moreover, in FIG. 5, a solid line indicates a graph without exhaust pulsation, a broken line indicates a graph with exhaust pulsation of about ±2.5 kPa, and a one-dot chain line indicates a graph with exhaust pulsation of about ±5 kPa.

Further, in FIG. 6, the horizontal axis indicates a pressure sensing error [%] of the differential pressure sensor SW15, and the vertical axis indicates an error [%] (flow rate estimation error) when the flow rate of EGR gas which flows through the EGR valve 54 is estimated using the flow rate function. In FIG. 6, a solid line indicates a graph when the negative pressure is 5 kPa, and a broken line indicates a graph when the negative pressure is 2 kPa. Note that the term "negative pressure" as used herein is fundamentally synonymous with the pressure differential between the upstream side and the downstream side of the EGR valve 54. That is, the negative pressure means a difference between a pressure at the upstream end of the EGR passage 52 (it is a pressure of the exhaust passage 50 at the downstream side of the catalytic converter 51, and fundamentally and substantially coincides with the atmospheric pressure) and a pressure at the downstream end of the EGR passage 52 (it is a pressure of the intake passage 40 at the downstream side of the throttle valve 43 and at the upstream side of the supercharger 44).

As illustrated in FIG. 5, when the negative pressure is 2 kPa, (in this case, the pressure ratio becomes 0.98 if the atmospheric pressure is 100 kPa), the magnitude of the influence of the exhaust pulsation given to the flow rate of EGR gas is about 40% (see arrows A1). When the negative pressure is 5 kPa (in this case, the pressure ratio becomes 0.95 if the atmospheric pressure is 100 kPa), the magnitude of the influence of the exhaust pulsation given to the flow rate of EGR gas is about 8%. That is, when the negative pressure is 5 kPa, the influence of the exhaust pulsation is hardly received, compared with the case where the negative pressure is 2 kPa. Moreover, as illustrated in FIG. 6, if the pressure sensing error of the differential pressure sensor SW15 is 1 kPa, the flow rate estimation error is about 30% when the negative pressure is 2 kPa, and the flow rate estimation error is about 10% when the negative pressure is 5 kPa. That is, when the negative pressure is 5 kPa, the influence of the pressure sensing error given to the flow rate estimation becomes quite smaller than that when the negative pressure is 2 kPa. This is because an absolute value of the flow rate function becomes larger and the slope of the flow rate function also becomes shallow as the negative pressure increases, and therefore, the influence of the pressure sensing error also becomes smaller.

From the above, when the pressure differential between the upstream side and the downstream side of the EGR valve 54 is comparatively large, in detail, when the pressure differential is 5 kPa or more, it can be said that the influence of the exhaust pulsation becomes smaller. Thus, since the accuracy of the abnormality determination of the differential pressure sensor SW15 can be secured when the influence of the exhaust pulsation becomes smaller, the abnormality determination of the differential pressure sensor SW15 is performed in this embodiment when the pressure differential between the upstream side and the downstream side of the EGR valve 54 is comparatively large. Here, if the abnormality determination is performed only in the situation where the pressure differential becomes large according to the operating state of the engine 1 by the course of nature, the frequency of performing the abnormality determination will decrease. Therefore, a large pressure differential may be generated between the upstream side and the downstream side of the EGR valve 54 when performing the abnormality determination of the differential pressure sensor SW15, however, if this pressure differential is made too large, fuel efficiency tends to decrease.

Therefore, in this embodiment, the ECU 10 performs a control for generating the pressure differential of 5 kPa between the upstream side and the downstream side of the EGR valve 54 when performing the abnormality determination of the differential pressure sensor SW15. In detail, the ECU 10 controls the throttle valve 43 at least toward the closed side in order to maintain the pressure differential between the upstream side and the downstream side of the EGR valve 54 at 5 kPa (hereinafter, such a pressure differential is suitably referred to as a "target pressure differential"). In detail, the ECU 10 sets a pressure of the intake passage 40 at the downstream side of the throttle valve 43 and the upstream side of the supercharger 44 (hereinafter, suitably referred to as a "target supercharger upstream pressure"), which is required for realizing the target pressure differential, and carries out a feedback control of the opening of the throttle valve 43 based on the target supercharger upstream pressure.

Figure 7:
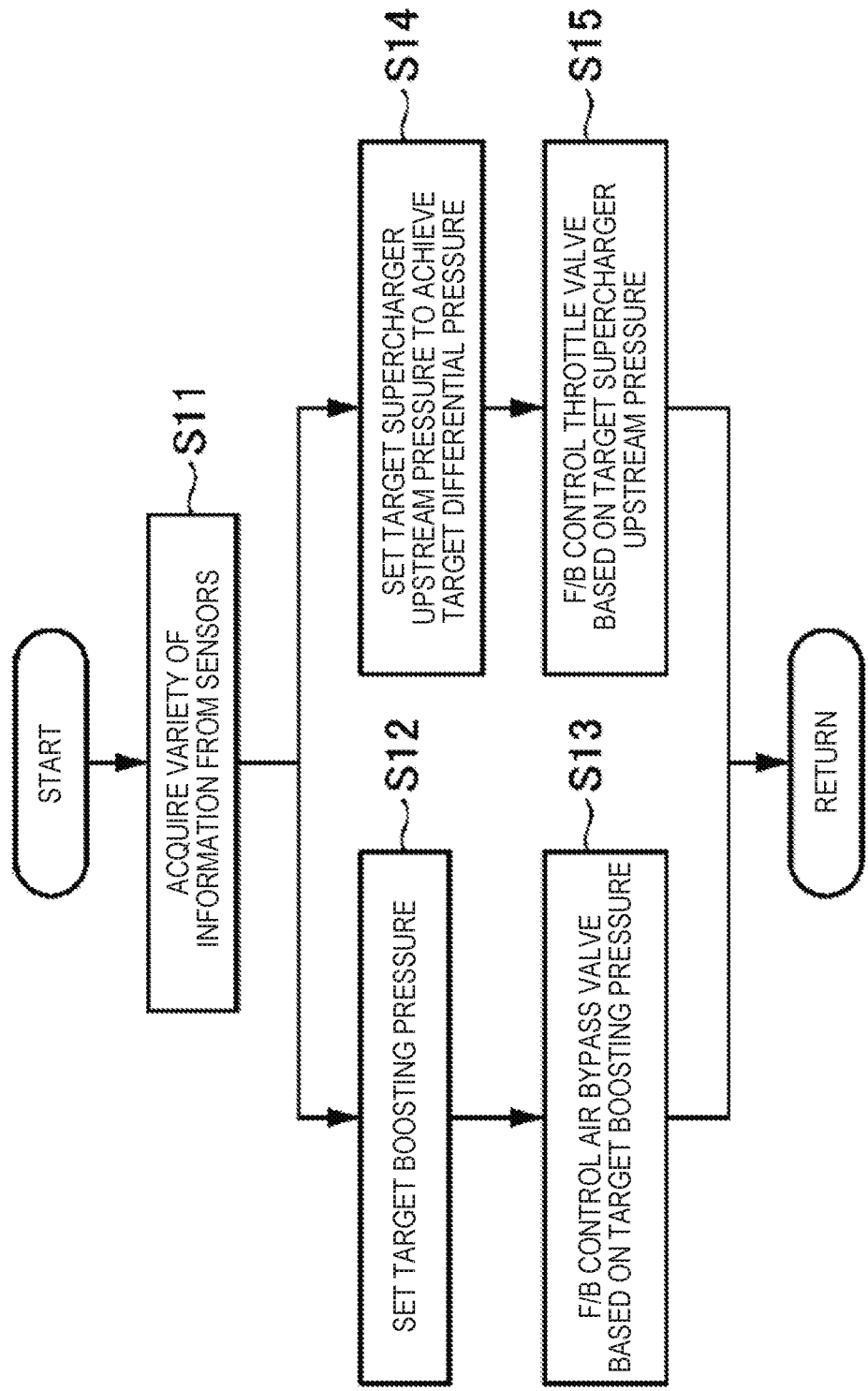
FIG. 7 is a flowchart illustrating a control of a throttle valve and an air bypass valve according to this embodiment of the present disclosure.

Next, referring to FIG. 7, in this embodiment of the present disclosure, a control of the throttle valve 43 and the air bypass valve 48 when performing the abnormality determination of the differential pressure sensor SW15 is specifically described. FIG. 7 is a flowchart illustrating the control of the throttle valve 43 and the air bypass valve 48 according to this embodiment of the present disclosure. Processing according to this flowchart is repeatedly performed by the ECU 10 at a given cycle while an execution command of the abnormality determination of the differential pressure sensor SW15 is issued.

First, at Step S11, the ECU 10 acquires a variety of information from the sensors SW1-SW17 described above (see FIGS. 1 and 3). Typically, the ECU 10 acquires the supercharger upstream pressure detected by the first pressure sensor SW3, the boosting pressure detected by the second pressure sensor SW5, and the atmospheric pressure detected by the atmospheric pressure sensor SW17.

Next, at Step S12, the ECU 10 calculates a target boosting pressure to be set for the supercharger 44. Fundamentally, the ECU 10 sets the target boosting pressure based on the current amount of air of the engine 1, a target amount of air to be supplied to the engine 1 according to a request, etc. from a driver (accelerator pedal operation), and the current boosting pressure detected by the second pressure sensor SW5. In detail, the ECU 10 calculates the target boosting pressure required for supplying the target amount of air to the engine 1 based on the current amount of air and the current boosting pressure. Moreover, the ECU 10 also sets the target boosting pressure taking the current EGR gas amount into consideration. For example, when the EGR gas amount increases, since the boosting pressure increases as a result of being controlled so that the amount of air becomes constant, the ECU 10 adjusts the target boosting pressure with respect to the target amount of air according to the controlled amount.

Next, at Step S13, the ECU 10 controls the air bypass valve 48 to achieve the target boosting pressure set at Step S12. In detail, the ECU 10 compares the current boosting pressure (actual boosting pressure) detected by the second pressure sensor SW5 with the target boosting pressure, and carries out the feedback control of the opening of the air bypass valve 48 so that the actual boosting pressure becomes in agreement with the target boosting pressure.

On the other hand, the ECU 10 performs processings at Steps S14 and S15 in parallel to the processings at Steps S12 and S13. First, at Step S14, the ECU 10 calculates the supercharger upstream pressure (target supercharger upstream pressure) required for setting the pressure differential between the upstream side and the downstream side of the EGR valve 54 as the target pressure differential (5 kPa). In detail, since the ECU 10 uses the atmospheric pressure (about 100 kPa) detected by the atmospheric pressure sensor SW17 as the pressure at the upstream side of the EGR valve 54, and the difference between the atmospheric pressure and the supercharger upstream pressure which is the pressure at the downstream side of the EGR valve 54 should be 5 kPa, the ECU 10 sets the pressure obtained by subtracting 5 kPa from the atmospheric pressure as the target supercharger upstream pressure.

Next, at Step S15, the ECU 10 controls the throttle valve 43 so as to achieve the target supercharger upstream pressure set at Step S14. In detail, the ECU 10 compares the current supercharger upstream pressure (actual supercharger upstream pressure) detected by the first pressure sensor SW3 with the target supercharger upstream pressure, and carries out the feedback control of the opening of the throttle valve 43 so that the actual supercharger upstream pressure becomes in agreement with the target supercharger upstream pressure.

Here, at Steps S14 and S15, when the throttle valve 43 is controlled so that the target pressure differential is achieved, since the supercharger upstream pressure changes, the boosting pressure downstream thereof also tends to change. In this case, at Steps S12 and S13 which are parallel to Steps S14 and S15, since the feedback control of the air bypass valve 48 is carried out so that the target boosting pressure is achieved, independently from the control of the throttle valve 43, the boosting pressure is maintained substantially constant. That is, the feedback control of the air bypass valve 48 is performed so that the change in the boosting pressure caused by the control of the throttle valve 43 is compensated. Typically, in order to achieve the target pressure differential of 5 kPa, i.e., in order to generate the negative pressure of about 5 kPa downstream of the throttle valve 43, the ECU 10 controls the throttle valve 43 toward the closed side, controls the air bypass valve 48 toward the closed side to compensate the reduction in air caused by the control of the throttle valve 43. Thus, since the feedback control of the throttle valve 43 and the feedback control of the air bypass valve 48 are performed in parallel to and independent from each other, both the upstream side and the downstream side of the supercharger 44 can be set suitably to the desired pressures (the target supercharger upstream pressure and the target boosting pressure).

Figure 8:
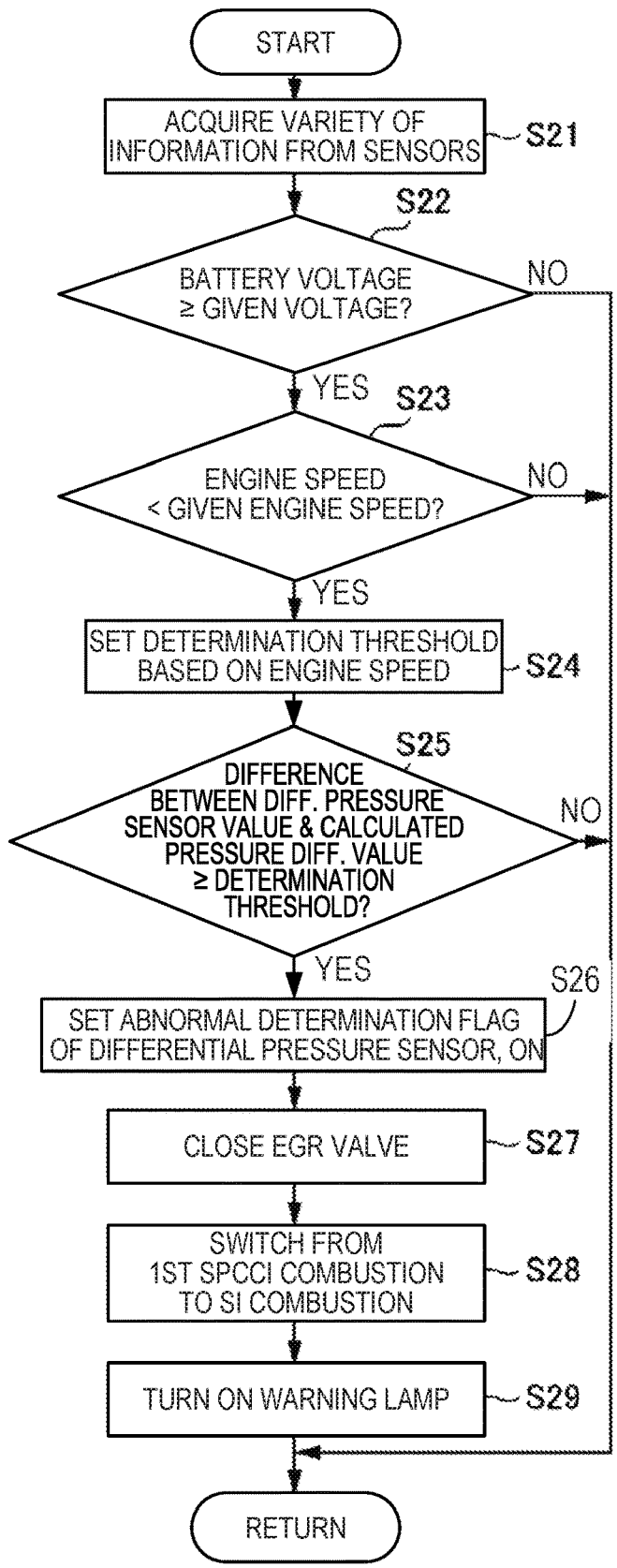
FIG. 8 is a flowchart illustrating an abnormality determination of the differential pressure sensor according to this embodiment of the present disclosure.

Next, referring to FIG. 8, the abnormality determination of the differential pressure sensor SW15 according to this embodiment of the present disclosure is described concretely. FIG. 8 is a flowchart illustrating the abnormality determination of the differential pressure sensor SW15 according to this embodiment of the present disclosure. This processing according to the flowchart is repeatedly executed by the ECU 10 in parallel to the processing according to the flowchart illustrated in FIG. 7 at a given cycle, while the execution command of the abnormality determination of the differential pressure sensor SW15 is issued.

First, at Step S21, the ECU 10 acquires a variety of information from the sensors SW1-SW17 described above (see FIGS. 1 and 3). Typically, the ECU 10 acquires the supercharger upstream pressure detected by the first pressure sensor SW3, the engine speed detected by the engine speed sensor SW9, the pressure differential detected by the EGR differential pressure sensor SW15, and the atmospheric pressure detected by the atmospheric pressure sensor SW17. The ECU 10 acquires a voltage of a battery for driving various electronic devices in the vehicle including the sensors SW1-SW17, etc.

At Step S22, the ECU 10 determines whether the battery voltage acquired at Step S21 is greater than or equal to a given voltage. Here, in order to secure the accuracy of the abnormality determination of the differential pressure sensor SW15, it is determined whether the battery voltage is stable and whether the differential pressure sensor SW15 is in a state where it can output a reliable detection signal. If the battery voltage is greater than or equal to the given voltage (Step S22: Yes), the ECU 10 shifts to Step S23, where the abnormality determination of the differential pressure sensor SW15 is performed. On the other hand, if the battery voltage is lower than the given voltage (Step S22: No), the ECU 10 escapes from the series of routines illustrated in this flowchart. In this case, the ECU 10 does not perform the abnormality determination of the differential pressure sensor SW15.

Next, at Step S23, the ECU 10 determines whether the engine speed acquired at Step S21 is lower than a given engine speed. In this embodiment, at Step S23, the ECU 10 performs the abnormality determination of the differential pressure sensor SW15, only if the engine speed is lower than the given engine speed, i.e., only in a low-speed range. This is because, in this embodiment the atmospheric pressure is used as the pressure at the upstream side of the EGR valve 54 which defines the pressure differential in the EGR valve 54, and in the low-speed range the pressure at the upstream side of the EGR valve 54 becomes accurately in agreement with the atmospheric pressure. In addition, that is because the influence of the exhaust pulsation is comparatively small in the low-speed range. Note that the given engine speed used for the determination at Step S23, i.e., the given engine speed for determining the low-speed range, is set to about 2000 rpm, for example.

As a result at Step S23, if the engine speed is lower than the given engine speed (Step S23: Yes), the ECU 10 shifts to Step S24, where it performs the abnormality determination of the differential pressure sensor SW15. On the other hand, if the engine speed is greater than or equal to the given engine speed (Step S23: No), the ECU 10 exits from the series of routines illustrated in this flowchart. In this case, the ECU 10 does not perform the abnormality determination of the differential pressure sensor SW15.

Figure 9:
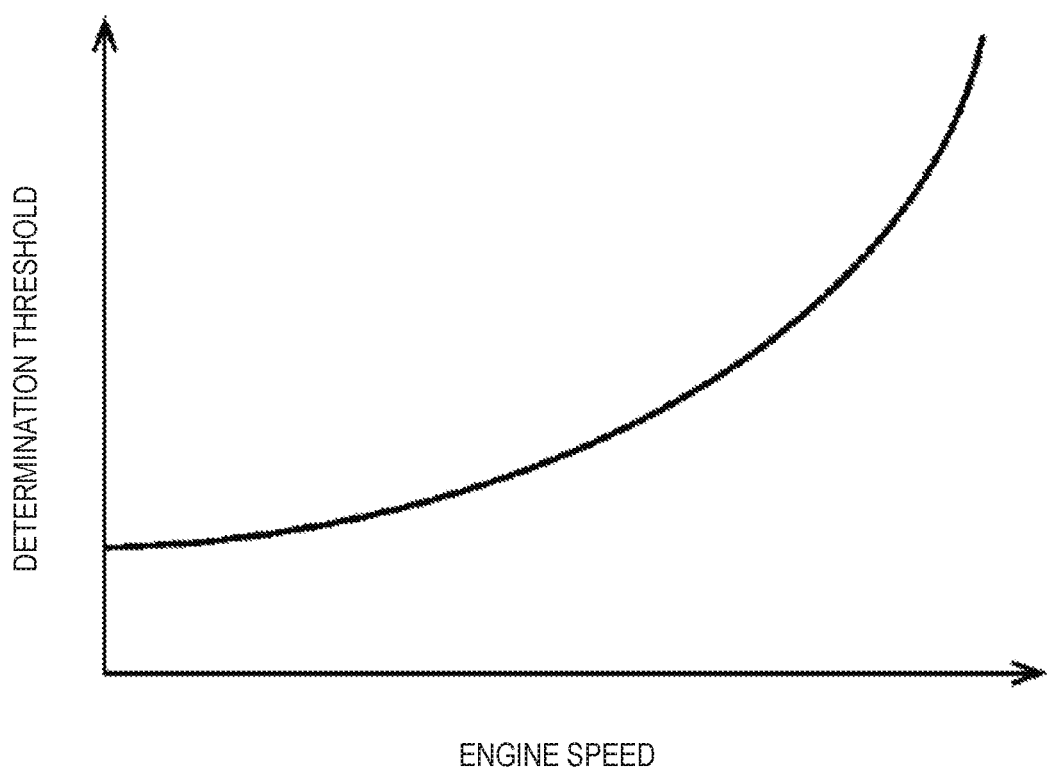
FIG. 9 is a map which defines a determination threshold to be set for an engine speed.

Next, at Step S24, the ECU 10 sets a determination threshold to be used for the abnormality determination of the differential pressure sensor SW15 based on the engine speed acquired at Step S21. In detail, the ECU 10 sets the determination threshold corresponding to the current engine speed while referring to a map as illustrated in FIG. 9. FIG.

9 illustrates the map which defines the determination threshold (vertical axis) to be set according to the engine speed (horizontal axis). This determination threshold is a threshold which is defined by the pressure and is applied when performing the abnormality determination based on the pressure differential detected by the differential pressure sensor SW15 (in detail, the differential pressure sensor SW15 is determined to be abnormal when the value used for the determination becomes the determination threshold or more). As illustrated in FIG. 9, the determination threshold to be set becomes larger as the engine speed increases. This is because the influence of the exhaust pressure is to be eliminated by increasing the determination threshold since the influence of the exhaust pressure becomes larger as the engine speed increases.

Next, at Step S25, the ECU 10 first calculates the pressure differential at the upstream side and the downstream side of the EGR valve 54 (hereinafter, suitably referred to as a "calculated pressure differential value"), and determines whether a difference (here, an absolute value is used) between the calculated pressure differential value and the pressure differential detected by the differential pressure sensor SW15 (hereinafter, suitably referred to as a "differential pressure sensor value") is equal to or larger than the determination threshold set at Step S24. In this case, the ECU 10 calculates the calculated pressure differential value by subtracting the atmospheric pressure detected by the atmospheric pressure sensor SW17 from the supercharger upstream pressure detected by the first pressure sensor SW3.

As a result at Step S25, if the difference between the differential pressure sensor value and the calculated pressure differential value is equal to or larger than the determination threshold (Step S25: Yes), the ECU 10 shifts to Step S26, where it determines that the differential pressure sensor SW15 is abnormal and set an abnormal determination flag of the differential pressure sensor SW15. On the other hand, if the difference between the differential pressure sensor value and the calculated pressure differential value is below the determination threshold (Step S25: No), the ECU 10 exits from the series of routines illustrated in this flowchart. In this case, the ECU 10 determines that the differential pressure sensor SW15 is normal, and it clears the abnormal determination flag of the differential pressure sensor SW15.

Note that when the difference between the differential pressure sensor value and the calculated pressure differential value is greater than or equal to the determination threshold, it does not have to immediately determine that the differential pressure sensor SW15 is abnormal. For example, when a state where the difference between the differential pressure sensor value and the calculated pressure differential value is greater than or equal to the determination threshold continues for greater than or equal to a given period of time, it may determine that the differential pressure sensor SW15 is abnormal. In this case, even if the difference between the differential pressure sensor value and the calculated pressure differential value is greater than or equal to the determination threshold, the determination of the differential pressure sensor SW15 may stand by until the state continues for greater than or equal to the given period of time.

After Step S26, the ECU 10 shifts to Step S27, where it performs a control for closing the EGR valve 54 (fully closed control). This is because it becomes impossible to appropriately control the EGR valve 54 based on the pressure differential detected by the differential pressure sensor SW15 which is "abnormal." That is, since it becomes impossible to control the EGR gas amount with sufficient accuracy by the EGR valve 54 (since it becomes impossible to secure the EGR controllability), the EGR valve 54 is closed to stop the recirculation of the EGR gas to the intake passage 40.

Next, at Step S28, if the engine 1 performs the first SPCCI combustion, the ECU 10 prohibits the first SPCCI combustion and performs a control for switching combustion from the first SPCCI combustion to SI combustion. Since the first SPCCI combustion is performed in a state where EGR gas is recirculated as described above (in detail, the first SPCCI combustion is performed in a state where the gas-fuel ratio (G/F) is lean (a state where comparatively a large amount of EGR gas is introduced)), the first SPCCI combustion is prohibited when the recirculation of EGR gas is stopped due to the "abnormal" differential pressure sensor SW15.

In detail, the ECU 10 controls the intake VVT 23 so that the close timing of the intake valve 21 is delayed, when switching the combustion from the first SPCCI combustion to SI combustion. Thus, the effective compression ratio of the engine 1 is lowered to reduce knocking. Moreover, in addition to such a control of the intake VVT 23, the ECU 10 controls the exhaust VVT 24 to advance the close timing of the exhaust valve 22. Therefore, knocking is further reduced by reducing the overlap period of the intake valve 21 and the exhaust valve 22, reducing the amount of internal EGR gas introduced into the combustion chamber 17, and thus reducing the in-cylinder temperature. Moreover, the ECU 10 controls the ignition plug 25 to retard the ignition timing in order to further reduce knocking.

Next, at Step S29, the ECU 10 turns on a warning lamp indicative of the differential pressure sensor SW15 being abnormal. Then, the ECU 10 escapes from the series of routines illustrated in this flowchart.

<Operation and Effects>

Next, operation and effects of the method of determining the abnormality of the differential pressure sensor and the abnormality determination system according to this embodiment of the present disclosure are described.

Figure 10:
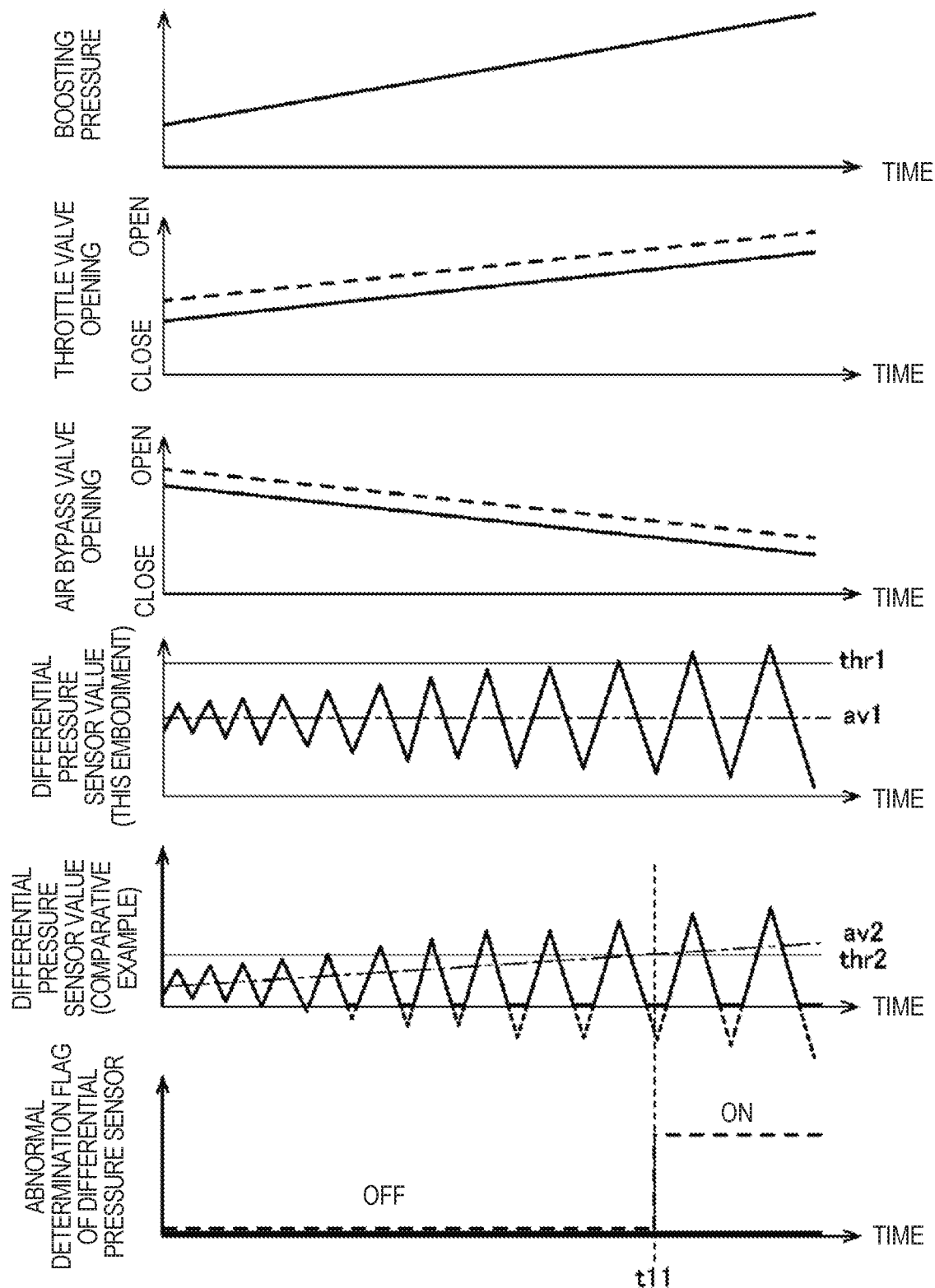
FIG. 10 is a time chart illustrating a result when performing the abnormality determination of the differential pressure sensor according to this embodiment of the present disclosure.

FIG. 10 is a time chart illustrating one example of a result of the abnormality determination of the differential pressure sensor SW15 according to this embodiment of the present disclosure. FIG. 10 illustrates, from the top, the boosting pressure, the opening of the throttle valve 43, the opening of the air bypass valve 48, the differential pressure sensor value of the differential pressure sensor SW15 according to this embodiment, the differential pressure sensor value of the differential pressure sensor SW15 according to a comparative example, and the abnormal determination flag of the differential pressure sensor SW15. Moreover, in FIG. 10, as for the opening of the throttle valve 43, the opening of the air bypass valve 48, and the abnormal determination flag of the differential pressure sensor SW15, solid lines indicate the results of this embodiment and broken lines indicate the results of the comparative example. Note that FIG. 10 illustrates the results when the differential pressure sensor SW15 is normal in fact for both this embodiment and the comparative example.

In the comparative example, when performing the abnormality determination of the differential pressure sensor SW15, the control for positively changing the pressure differential between the upstream side and the downstream side of the EGR valve 54 is not performed, but the pressure differential is comparatively small (e.g., less than 2 kPa). On the other hand, in this embodiment, when performing the abnormality determination of the differential pressure sensor SW15, the throttle valve 43 is controlled to be closed more than the comparative example so that the pressure differential between the upstream side and the downstream side of the EGR valve 54 becomes comparatively large. In detail, the pressure differential becomes 5 kPa, and according to this control of the throttle valve 43, the air bypass valve 48 is controlled to a more closed side than the comparative example. Note that in the example illustrated in FIG. 10, the boosting pressure increases, and according to this increase in the boosting pressure, the throttle valve 43 is controlled gradually toward the opened side and the air bypass valve 48 is controlled gradually toward the closed side, for both this embodiment and the comparative example. Thus, the exhaust pulsation also becomes larger as the boosting pressure increases.

For both this embodiment and the comparative example, the differential pressure sensor value is changed due to the influence of the exhaust pulsation, and the fluctuation amplitude of the differential pressure sensor value becomes larger as the boosting pressure increases. Moreover, for both this embodiment and the comparative example, respective temporal average values av1 and av2 of the differential pressure sensor values are used for the abnormality determination of the differential pressure sensor SW15, instead of the differential pressure sensor value itself.

In the comparative example, since the pressure differential between the upstream side and the downstream side of the EGR valve 54 is comparatively small, the differential pressure sensor value fluctuates within a comparatively small value range. Therefore, in the comparative example, as illustrated by the broken line in the graph of the differential pressure sensor value, the pressure differential between the upstream side and the downstream side of the EGR valve 54 may be less than a lower limit above which it can be detected by the differential pressure sensor SW15, and, in such a case, the differential pressure sensor value is fixed to the lower limit. Therefore, in the comparative example, the average value av2 of the differential pressure sensor value is raised to become larger than the value corresponding to the actual pressure differential. As a result, in the comparative example, the average value av2 of the differential pressure sensor value becomes a threshold thr2 or more according to the calculated pressure differential value at a time t11 (this threshold thr2 is a value obtained by adding the determination threshold described above to the calculated pressure differential value, and the average value av2 of the differential pressure sensor value becoming the threshold thr2 or more is equivalent to the difference between the average value av2 and the calculated pressure differential value becoming the determination threshold or more), and the abnormal determination flag of the differential pressure sensor SW15 is set. In this case, in the comparative example, the differential pressure sensor SW15 is unintentionally determined to be abnormal.

On the other hand, in this embodiment, since the pressure differential between the upstream side and the downstream side of the EGR valve 54 is comparatively large, the differential pressure sensor value fluctuates in a comparatively large value range. Therefore, in this embodiment, unlike the comparative example, the pressure differential between the upstream side and the downstream side of the EGR valve 54 will never become less than the lower limit below which it cannot be detected by the differential pressure sensor SW15, and the differential pressure sensor value always exceeds the lower limit. Therefore, in this embodiment, unlike the comparative example, the average value av1 of the differential pressure sensor value is not raised, and it will never become larger than the value corresponding to the actual pressure differential. Therefore, in this embodiment, the average value av1 of the differential pressure sensor value will never become larger than a threshold thr1 according to the calculated pressure differential value (this threshold thr1 is a value obtained by adding the determination threshold described above to the calculated pressure differential value, and the average value av1 of the differential pressure sensor value being less than the threshold thr1 is equivalent to the difference between the average value av1 and the calculated pressure differential value being below the determination threshold), and the abnormal determination flag of the differential pressure sensor SW15 is maintained cleared. Thus, according to this embodiment, the differential pressure sensor SW15 can be determined accurately.

Figure 11:
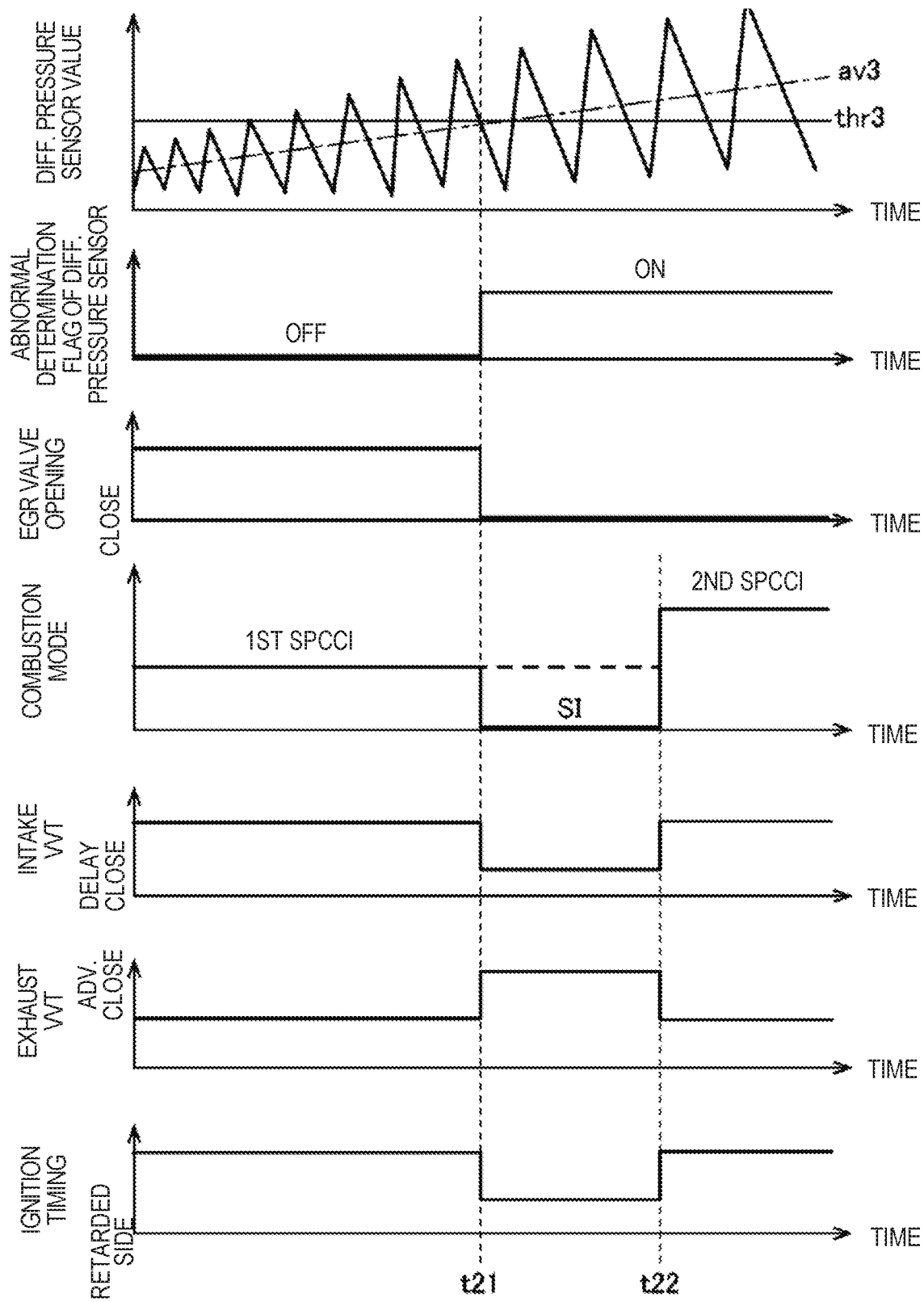
FIG. 11 is a time chart illustrating a result when performing an engine control during the abnormality determination of the differential pressure sensor according to this embodiment of the present disclosure.

Next, FIG. 11 is a time chart illustrating one example of the result of the engine control during the abnormality determination of the differential pressure sensor SW15 in this embodiment of the present disclosure. FIG. 11 illustrates, from the top, the differential pressure sensor value of the differential pressure sensor SW15, the abnormal determination flag of the differential pressure sensor SW15, the opening of the EGR valve 54, the combustion mode of the engine 1, the operation of the intake VVT 23 (especially, the close timing of the intake valve 21 by the intake VVT 23), the operation of the exhaust VVT 24 (especially, the close timing of the exhaust valve 22 by the exhaust VVT 24), and the ignition timing of the ignition plug 25.

As illustrated in FIG. 11, at a time t21, an average value av3 of the differential pressure sensor value becomes equal to or larger than a threshold thr3 according to the calculated pressure differential value, and the abnormal determination flag of the differential pressure sensor SW15 is set. At this time, the EGR valve 54 is closed so that the recirculation of the EGR gas to the intake passage 40 is stopped. In addition, in this embodiment, the combustion mode of the engine 1 is switched from the first SPCCI combustion to SI combustion (in the comparative example, as illustrated by a broken line, the combustion mode of the engine 1 is maintained in the first SPCCI combustion). Moreover, in this embodiment, when switching from the first SPCCI combustion to SI combustion, the control of the intake VVT 23 for delaying the close timing of the intake valve 21, the control of the exhaust VVT 24 for advancing the close timing of the exhaust valve 22, and the control of the ignition plug 25 for retarding the ignition timing are performed to reduce the knocking of the engine 1.

Then, at a time t22, when the given condition is satisfied, the combustion mode of the engine 1 is switched from SI combustion to the second SPCCI combustion. That is, in this embodiment, although the first SPCCI combustion is prohibited during the abnormality determination of the differential pressure sensor SW15, the second SPCCI combustion is permitted. For example, in a situation where the combustion stability is secured, and it is determined that combustion noise does not become a problem even if SPCCI combustion is performed (in one example, it is determined based on the in-cylinder pressure detected by the pressure indicating sensor SW6), the combustion mode is switched from SI combustion to the second SPCCI combustion. Thus, when switching from SI combustion to the second SPCCI combustion, the control of the intake VVT 23 for advancing the close timing of the intake valve 21, the control of the exhaust VVT 24 for delaying the close timing of the exhaust valve 22, and the control of the ignition plug 25 for advancing the ignition timing are performed.

As described above, according to this embodiment, since the ECU 10 controls the throttle valve 43 toward the closed side so that the pressure differential between the upstream side and the downstream side of the EGR valve 54 is maintained greater than or at the given pressure when performing the abnormality determination of the differential pressure sensor SW15, the abnormal determination can be performed with sufficient accuracy, while securing the frequency of performing the abnormality determination. Moreover, by thus maintaining the pressure differential greater than or at the given pressure, the deterioration of the EGR controllability due to the exhaust pulsation can be prevented, thereby securing fuel efficiency. Further, according to this embodiment, since the ECU 10 executes the abnormality determination of the differential pressure sensor SW15 only when the engine speed is lower than the given engine speed, i.e., only in the low-speed range, and prohibits the execution of the abnormality determination in the high-speed range where the exhaust flow rate is large and the influence of pulsation is large, the accuracy of the abnormality determination can appropriately be secured.

Moreover, according to this embodiment, the ECU 10 determines that the differential pressure sensor SW15 is abnormal when the difference between the pressure differential detected by the differential pressure sensor SW15 (differential pressure sensor value), and the pressure differential between the supercharger upstream pressure detected by the first pressure sensor SW3 and the atmospheric pressure detected by the atmospheric pressure sensor SW17 (calculated pressure differential value) is greater than or equal to the determination threshold. Therefore, the abnormality of the differential pressure sensor SW15 can be determined accurately.

Moreover, according to this embodiment, since the ECU 10 sets the determination threshold as the higher value as the engine speed increases, the accuracy of the abnormality determination can be secured effectively, while appropriately eliminating the influence of the exhaust pressure when the engine speed increases.

Moreover, according to this embodiment, since ECU 10 maintains the pressure differential between the upstream side and the downstream side of the EGR valve 54 greater than or at 5 kPa when performing the abnormality determination of the differential pressure sensor SW15, the accuracy of the abnormality determination can be effectively secured. In this case, the ECU 10 can prevent the deterioration in fuel efficiency resulting from the generation of the pressure differential, when the pressure differential is maintained exactly at 5 kPa (i.e., if the minimum pressure differential is generated).

Moreover, according to this embodiment, when ECU 10 controls the throttle valve 43 so that the pressure differential is maintained greater than or at the given pressure in order to determine the abnormality of the differential pressure sensor SW15, it carries out the feedback control of the air bypass valve 48 based on the target boosting pressure so that the fluctuation of the boosting pressure due to this control of the throttle valve 43 is compensated. Thus, the pressure at the upstream side of the supercharger 44 (in detail, the pressure at the downstream side of the throttle valve 43 and the upstream side of the supercharger 44, in other words, the pressure at the downstream side of the EGR valve 54 which defines the pressure differential of the EGR valve 54), and the pressure at the downstream side of the supercharger 44 (boosting pressure) can be both suitably set at the desired pressures.

Moreover, in this embodiment, a mechanical supercharger 44 which is driven by the engine 1 is used. In such a supercharger 44, although the boosting pressure cannot be adjusted by the direct control of the supercharger 44, the target boosting pressure can appropriately be achieved by controlling the air bypass valve 48 as described above.

Moreover, in this embodiment, the EGR system 55 which recirculates the exhaust gas at the downstream side of the catalytic converter 51 to the intake passage 40 (a so-called "low-pressure EGR system") is used. In this EGR system 55, since the pressure at the upstream side of the EGR valve 54 becomes substantially the atmospheric pressure, the EGR system 55 recirculates the EGR gas in a state where the pressure differential between the upstream side and the downstream side of the EGR valve 54 is difficult to be produced, but the controllability of the EGR system 55 can appropriately be secured by performing the control so that the pressure differential between the upstream side and the downstream side of the EGR valve 54 is maintained greater than or at the given pressure, as described above.

Moreover, in this embodiment, the engine 1 performs the first SPCCI combustion in which compression ignition combustion of the mixture gas inside the combustion chamber 17 is carried out by the self-ignition in the state where the gas-fuel ratio (G/F) is lean (the state where the comparatively large amount of EGR gas is introduced) and the air-fuel ratio (A/F) is substantially in agreement with a stoichiometric air-fuel ratio. For such an engine 1, by performing the abnormality determination of the differential pressure sensor SW15 with sufficient accuracy as described above, since the EGR gas amount is controllable with sufficient accuracy by using the differential pressure sensor SW15 of which the reliability is secured, the first SPCCI combustion can be carried out appropriately.

Moreover, in this embodiment, since the engine 1 further performs, in addition to the first SPCCI combustion, the second SPCCI combustion in which compression ignition combustion of mixture gas is carried out by a self-ignition in the state where the air-fuel ratio (A/F is lean, the improvement in fuel efficiency and the reduction of $NO_x$ can be achieved appropriately.

Moreover, in this embodiment, when determined that the differential pressure sensor SW15 is abnormal, the ECU 10 prohibits the first SPCCI combustion and permits the second SPCCI combustion. Therefore, the first SPCCI combustion using EGR gas can be prohibited appropriately in the state where the EGR controllability is not secured because of the abnormality of the differential pressure sensor SW15. On the other hand, since the second SPCCI combustion is permitted, while the first SPCCI combustion is prohibited, the improvement in fuel efficiency and the reduction of $NO_x$ by the SPCCI combustion can appropriately be secured.

Moreover, in this embodiment, since the engine 1 performs the second SPCCI combustion in the low-load low-speed range and performs the SI combustion in other ranges, the suitable combustion can be achieved in all the operating ranges of the engine 1.

<Modifications>

In the above embodiment, although the combustion mode of the engine 1 is switched between the SI combustion and the SPCCI combustion (partial compression ignition combustion), the present disclosure is not limited to be applied to such a configuration in which the combustion mode is switched. The present disclosure may also be applicable to a configuration in which the combustion mode of the engine 1 is switched between the SI combustion and the CI combustion which is used instead of SPCCI combustion.

In the above embodiment, although the supercharger 44 which is mechanically driven by the engine 1 is provided to the intake passage 40, an electric supercharger driven by an electric motor or a turbocharger driven by energy of exhaust gas may be provided instead of the mechanical supercharger 44.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
6 Injector
10 ECU
17 Combustion Chamber
21 Intake Valve
22 Exhaust Valve
23 Intake VVT
24 Exhaust VVT
25 Ignition Plug
40 Intake Passage
43 Throttle Valve
44 Supercharger
48 Air Bypass Valve
50 Exhaust Passage
52 EGR Passage
54 EGR Valve
SW3 First Pressure Sensor
SW5 Second Pressure Sensor
SW15 EGR Differential Pressure Sensor
SW17 Atmospheric Pressure Sensor

What is claimed is:

1. A method of determining an abnormality of a differential pressure sensor configured to detect a pressure differential between an upstream side and a downstream side of an exhaust gas recirculation (EGR) valve provided to an EGR passage of an engine, the method comprising the steps of:
   controlling an opening of the EGR valve based on an output value of the differential pressure sensor;
   determining the abnormality of the differential pressure sensor based on the output value of the differential pressure sensor;
   controlling at least a throttle valve of the engine toward a closed side so that the pressure differential between the upstream side and the downstream side of the EGR valve is maintained at greater than or equal to a given pressure when determining the abnormality of the differential pressure sensor; and
   prohibiting the execution of the abnormality determination of the differential pressure sensor when an engine speed of the engine is greater than or equal to a given engine speed, and permitting the execution of the abnormality determination of the differential pressure sensor when the engine speed is less than the given engine speed.

2. The method of claim 1, wherein determining the abnormality of the differential pressure sensor includes determining that the differential pressure sensor is abnormal when a difference between a pressure differential corresponding to the output value of the differential pressure sensor, and a difference between a pressure corresponding to an output value of a pressure sensor provided at the downstream side of the EGR valve and a pressure corresponding to an output value of an atmospheric pressure sensor, is greater than or equal to a given determination threshold.

3. The method of claim 2, further comprising setting the determination threshold at a higher value as the engine speed increases.

4. The method of claim 1, wherein the given pressure is 5 kPa.

5. The method of claim 1, wherein the engine is provided with a supercharger configured to boost intake air supplied to the engine, a bypass passage configured to circulate the intake air while bypassing the supercharger, and a bypass valve provided to the bypass passage, the method further comprising:
   setting a target boosting pressure of the supercharger; and
   controlling the bypass valve so that the target boosting pressure is achieved,
   wherein controlling the bypass valve includes carrying out a feedback control of an opening of the bypass valve based on the target boosting pressure, when the throttle valve is controlled so that the pressure differential between the upstream side and the downstream side of the EGR valve is maintained at greater than or equal to the given pressure in order to determine the abnormality of the differential pressure sensor, so as to compensate a change in a boosting pressure caused by the control of the throttle valve.

6. The method of claim 5, wherein the supercharger is a mechanical supercharger driven by the engine.

7. The method of claim 1, wherein the EGR passage recirculates, to an intake passage of the engine, exhaust gas at a downstream side of a catalyst provided to an exhaust passage of the engine.

8. The method of claim 1, wherein the engine has a first combustion mode in which compression ignition combustion of a mixture gas inside the combustion chamber is carried out by self-ignition in a state where a gas-fuel ratio (G/F) that is a ratio of a total amount of gas inside the combustion chamber including EGR gas from the EGR passage to an amount of fuel inside the combustion chamber is greater than a stoichiometric air-fuel ratio, and an air-fuel ratio (A/F) that is a ratio of an amount of air to the amount of fuel inside the combustion chamber is substantially in agreement with the stoichiometric air-fuel ratio.

9. The method of claim 8, wherein the engine further has a second combustion mode in which the compression ignition combustion is carried out in a state where the air-fuel ratio is larger than the stoichiometric air-fuel ratio.

10. The method of claim 9, further comprising prohibiting the first combustion mode and permitting the second combustion mode, when the differential pressure sensor is determined to be abnormal.

11. The method of claim 10, wherein the second combustion mode is carried out in a low-load low-speed range where a load of the engine is less than a given load and the engine speed is less than a given engine speed, and a third combustion mode, in which jump-spark ignition combustion of the entire mixture gas inside the combustion chamber is carried out by jump-spark ignition, is carried out in other ranges.

12. An abnormality determination system for a differential pressure sensor, comprising:
   the differential pressure sensor configured to detect a pressure differential between an upstream side and a downstream side of an exhaust gas recirculation (EGR) valve provided to an EGR passage of an engine; and
   a controller comprised of circuitry and configured to determine at least an abnormality of the differential pressure sensor,
   wherein the controller is configured to:

control an opening of the EGR valve based on an output value of the differential pressure sensor;
determine the abnormality of the differential pressure sensor based on the output value of the differential pressure sensor;
control at least a throttle valve of the engine toward a closed side so that the pressure differential between the upstream side and the downstream side of the EGR valve is maintained at greater than or equal to a given pressure when determining the abnormality of the differential pressure sensor; and
prohibit the abnormality determination of the differential pressure sensor when an engine speed of the engine is greater than or equal to a given engine speed, and permit the abnormality determination of the differential pressure sensor when the engine speed is less than the given engine speed.

* * * * *